US008713584B2

(12) United States Patent
Harm et al.

(10) Patent No.: US 8,713,584 B2
(45) Date of Patent: Apr. 29, 2014

(54) EVENT-TRIGGERED SERVER-SIDE MACROS

(75) Inventors: Michael W. Harm, New York, NY (US); Micah Lemonik, New York, NY (US)

(73) Assignee: Google Inc., Mountain View, CA (US)

( * ) Notice: Subject to any disclaimer, the term of this patent is extended or adjusted under 35 U.S.C. 154(b) by 826 days.

(21) Appl. No.: 12/540,846

(22) Filed: Aug. 13, 2009

(65) Prior Publication Data
US 2011/0041140 A1    Feb. 17, 2011

(51) Int. Cl.
*G06F 9/44* (2006.01)

(52) U.S. Cl.
USPC ............................. 719/320; 719/313; 719/318

(58) Field of Classification Search
None
See application file for complete search history.

(56) References Cited

U.S. PATENT DOCUMENTS

| | | | | |
|---|---|---|---|---|
| 6,529,784 | B1 * | 3/2003 | Cantos et al. | 700/79 |
| 7,284,054 | B2 * | 10/2007 | Radhakrishnan | 709/226 |
| 2002/0065947 | A1 * | 5/2002 | Wishoff et al. | 709/317 |
| 2002/0129264 | A1 | 9/2002 | Rowland et al. | |
| 2004/0132438 | A1 | 7/2004 | White | |
| 2005/0033855 | A1 | 2/2005 | Moradi et al. | |
| 2006/0059107 | A1 * | 3/2006 | Elmore et al. | 705/64 |
| 2008/0071728 | A1 * | 3/2008 | Lim | 707/1 |
| 2008/0104042 | A1 * | 5/2008 | Gutt et al. | 707/4 |
| 2009/0037935 | A1 * | 2/2009 | Saha et al. | 719/318 |

FOREIGN PATENT DOCUMENTS

| | | |
|---|---|---|
| EP | 1 126 657 A2 | 8/2001 |
| JP | 2000-155743 A | 6/2000 |
| JP | 2001-216211 A | 8/2001 |
| JP | 2003-501726 A | 1/2003 |
| WO | 00/73924 A2 | 12/2000 |
| WO | WO 2006/028783 A2 | 3/2006 |
| WO | WO 2007/100228 A1 | 9/2007 |

OTHER PUBLICATIONS

International Search Report & Written Opinion for Application No. PCT/US2010/045507, dated Apr. 28, 2011, 9 pages.
Notice of Reasons for Rejection for corresponding Japanese Application No. 2012-524909, dated Feb. 3, 2014.

* cited by examiner

*Primary Examiner* — T. D.
*Assistant Examiner* — Shih-Wei Kraft
(74) *Attorney, Agent, or Firm* — Birch, Stewart, Kolasch & Birch, LLP

(57) ABSTRACT

A computer-implemented method of managing computer macros is disclosed. The method includes storing code for a computer macro at an internet-accessible hosted computer system and associating the stored code with a user account on the hosted computer system. The method also includes automatically identifying with the hosted computer system, independent of whether a user associated with the user account is currently active on the hosted computer system, a triggering event that is defined as being directed to the macro. Furthermore, the method includes executing the macro using an application running on the hosted computer system to generate macro results, and storing the macro results on the hosted computer system.

12 Claims, 9 Drawing Sheets

600

Macro Rule Name [abczyx 601 ▽] Copy from [628 ▽] [Save] [Undo] [Display] [Cancel]

Description [This macro will text me when that large cloud drawings file hits my inbox 630]

Effective Date [Now 632 ▽] Expiration Date [Never 634 ▽] Run on... [Weekdays 636 ▽]

626

602 Macro Trigger

Property [email 608 ▽]

Activity
[Incoming message]
Inbox size
Tag size
610

Parameters
611

604 Macro Processing

Conditions ○Any ●All
☒ From user ⎫
☐ From domain ⎬ 617
☐ From user in group ⎭
☐ User as CC:
☒ Contains words in RE:
☐ Contains words in body
612

[Advanced Boolean] 618

Check Services
Locator [614 ▽]
Location of Sender
Location of User X
Location of CC
616

606 Macro Output

Property [email 620 ▽]

Action
☐ Send me email
☐ Call me
☒ Text me
☐ Send return email
☐ Send user X email
622

Parameters
624

FIG. 6

EVENT-TRIGGERED SERVER-SIDE MACROS

TECHNICAL FIELD

This document relates to network-based delivery of electronic content.

BACKGROUND

A macro is a set of instructions that can be executed inside one or more computer applications to provide enhanced and automatic interactivity with those applications, where at least part of the macro represents steps that could otherwise be taken manually by a user of an application. For example, a macro could be written so as to compute a value from certain numbers in a spreadsheet application and copy the value to a related word processing application on a desktop computer. A user could assign a "hot key" combination to the macro so that the macro can be run easily by the user simply by pressing the hot key combination. As another example, a macro could also be written to cause certain electronic messages (e.g., those from a spouse, client, or boss) to be elevated in importance so that they can be more easily seen by a user of a computing device. One familiar macro-based system is Visual Basic for Applications for the MICROSOFT OFFICE productivity suite.

SUMMARY

This document discusses systems and techniques for creating and using macros in a hosted computing system, often referenced as "the cloud." The macros can be stored and executed from a macro server sub-system, rather than from a client device, thus allowing the macros to be shared easily between users, because all qualified users can access the macros from many location as long as they can get on a network and provide their credentials.

In addition, the macros can readily access a number of applications and services, provided by the hosted computing system, or from third party systems that are separate from the hosted computer system. Such services can include services that provide information about locations of various users (as determined, e.g., from GPS on their mobile devices), services that provide news and weather feeds, and other such services. The applications can include, for example, email and other messaging applications, productivity applications such as spreadsheets and word processors, mapping applications, and mash-ups of various applications that can be presented together in a single presentation (which can be accessed by a user and even developed by the user to provide customized output from a macro).

The applications may be presented to the user via one or more web pages displayed using a web browser. The system may also provide for the recording of macros, where a user can invoke a macro recorder and the recorder can track the user's actions on a computer and turn those actions into macro code so that the actions can be repeated automatically at a later time when the user runs the macro.

Certain macros can be invoked from events that occur even when a user is not interacting with an application that is addressed by the particular macros, including when a user is not logged into the hosted system. In particular, if a macro is stored and executed on a server sub-system, the server sub-system may be established to monitor for particular events in the overall system that are addressed by a macro. Such events may then trigger the invocation of a macro, and the macro can execute on the server sub-system.

The macro can access services on the system or third-party services. Services on the system may grant access to data stores that correspond to a particular user who is registered with the system, with certain user-configurable security applied to the accessing. For example, a macro may be invoked in response to an electronic mail message coming into a user's account, and may in turn copy information from the message into a spreadsheet that is assigned to the user's account (e.g., so that the user can automatically compiled a spreadsheet that shows subject lines from all of their incoming messages). Such a macro may also check one or more services such as a location service, data at a weather-related web site, or may take other actions that use resources of the hosted system or systems external to the hosted system in order to gather data for the macro and make decisions using the macro. The macro may then take an action without the user having to be active in the system (e.g., not logged into the hosted system, or at the user's client computing device), such as by placing the message information in the spreadsheet, making a telephone call to a number corresponding to the user's account, or other such action.

Third-party services that the macros may access can include SOAP services or other similar services that may be accessed from a domain that is separate from the domain that provides the services, and that provide a well-known mechanism for sharing information over the internet. For example, a third-party service provider may compile up-to-date weather data and may make the data available to other services upon request.

In one implementation, a computer-implemented method of managing computer macros is disclosed. The method comprises storing code for a computer macro at an internet-accessible hosted computer system, associating the stored code with a user account on the hosted computer system, and automatically identifying with the hosted computer system, independent of whether a user associated with the user account is currently active on the hosted computer system, a triggering event that is defined as being directed to the macro. The method also comprises executing the macro using an application running on the hosted computer system to generate macro results, and storing the macro results on the hosted computer system. The method can additionally include generating a message to a communication address associated with the user account notifying a user of the results of the macro.

In some aspects, the triggering event comprises an incoming digital communication directed toward the user account. Also, the triggering event can comprise a determination of a location of a computer device user who is associated with the accountholder. The method can further include associating the macro with a registered user of the hosted computer system, and making the macro available to other users of the hosted computer system according to access restrictions identified by the registered user. In addition, the macro can be accessible in response to triggering events from a plurality of different user accounts.

In yet other aspects, the method further comprises receiving requests to execute the macro from a plurality of applications running on a plurality of different client computers remote from the hosted computer, automatically executing the macro on the hosted computer system for each of the requests from the location, and providing results of executing the macro to each respective application of the plurality of applications in response to executing the macro. Executing the macro can comprise making calls to multiple different hosted services provided by the hosted computer system. Also, executing the macro can include making calls to web services provided by third-party information providers that are independent of the hosted computer system. The method can additionally comprise translating information generated by a first application running on the hosted computer system to a different format and providing the translated information to a second application running on the hosted computer system, and also automatically providing the results of executing the macro to a plurality of different accounts for a plurality of different users registered with the hosted computer system.

In another implementation, a computer-implemented system for executing macros on a hosted computer system is disclosed. The system comprises a plurality of hosted applications operable from the hosted computer system, a macro data store storing a plurality of macros that are each assigned to a user account on the hosted computer system and that each define a series of actions to be executed by at least one of the plurality of hosted applications, and a processor to operate a scheduling module that identifies triggering events in the system and begins execution of one of the plurality of macros in response to an identified triggering event that corresponds to the one of the plurality of macros. The System can also include a processor operating an interface programmed to generate a message to a communication address associated with the user account notifying a user of the results of the macro.

In some aspects, the triggering event comprises an incoming digital communication directed toward the user account. The system can also include a location service to track locations of accountholders for the system, and wherein the triggering event comprises a determination of a location of a second accountholder who is associated with a first accountholder on whose behalf the macro is executed. The macro can be accessible in response to triggering events from a plurality of different user accounts, and the system can also include a plurality of documents associated with a plurality of accountholders for the system, wherein the plurality of documents include pointers to macros stored in the macro data store. Moreover, the system can include a location service to provide information about locations of users registered with the hosted computer system in response to a call from a macro. Also, the location service can provide information about a location only if a user in whose account a macro is running, is identified by the system as being associated with a user whose location information is to be provided.

In yet another implementation, a computer-implemented system for executing macros on a hosted computer system includes a plurality of hosted applications operable from the hosted computer system, a macro data store storing a plurality of macros that are each assigned to a user account on the hosted computer system and that each define a series of actions to be executed by at least one of the plurality of hosted applications, and means for executing the plurality of macros in response to identification of triggering events associated with particular accountholder, wherein the triggering event occurs independent of whether the particular accountholders are logged into the system.

The details of one or more embodiments are set forth in the accompanying drawings and the description below. Other features and advantages will be apparent from the description and drawings, and from the claims.

DESCRIPTION OF DRAWINGS

FIG. 6 shows an example screen shot of a macro construction system.

Like reference symbols in the various drawings indicate like elements.

DETAILED DESCRIPTION

Figure 1:
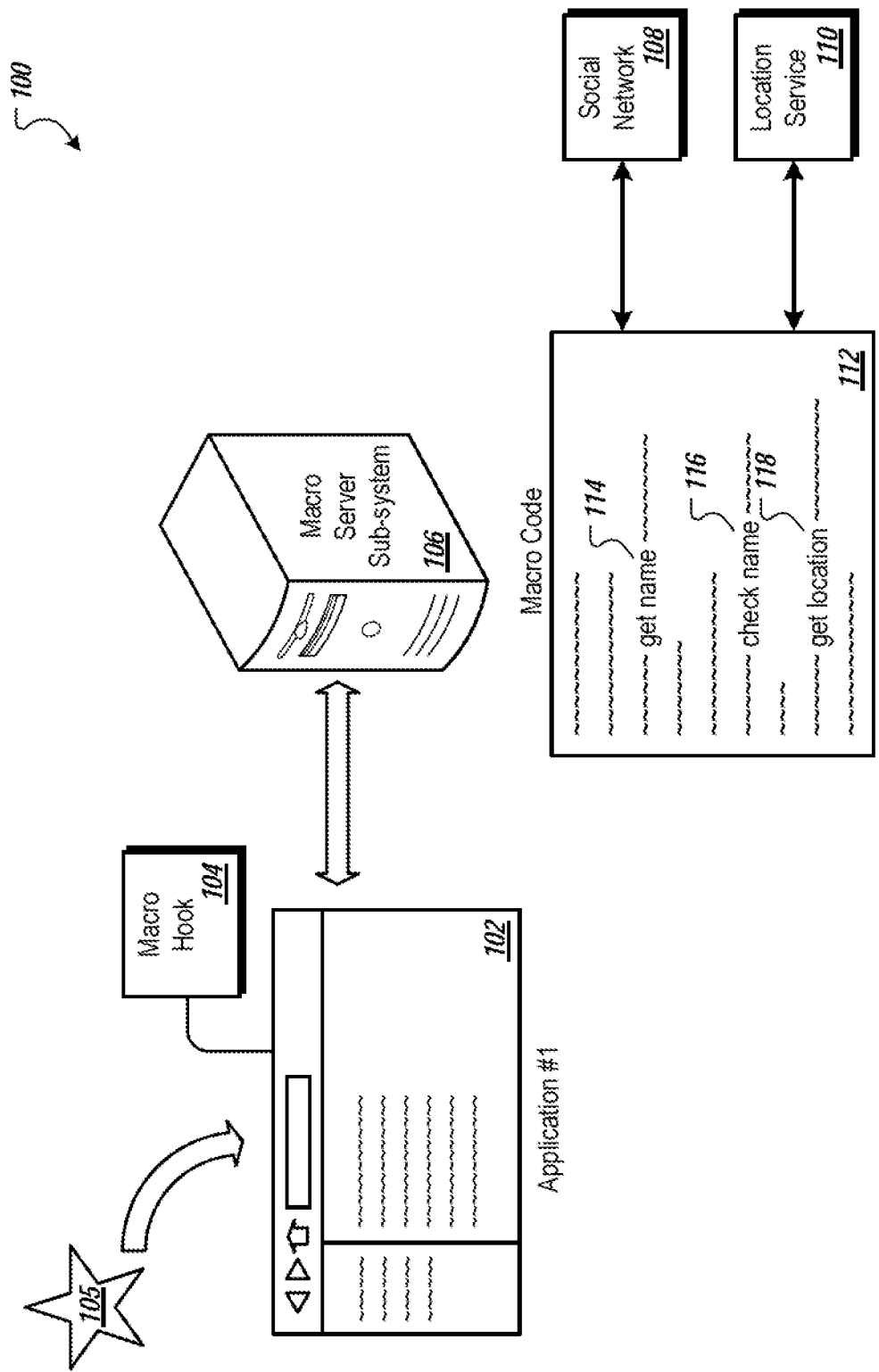
FIG. 1 is a conceptual diagram showing macro operation in a hosted computing system.

FIG. 1 is a conceptual diagram showing macro operation in a hosted computing system 100. Such operation can be contrasted with macro operation on a client device or on a server that is directed to a single client device (e.g., via a remote desktop connection service or VPN) by enabling operation of the macro from various clients, when the user who created and/or copied the macro to its stored location is trying to access the macro while running an application from their desktop computer, their net book computer, or from a publicly available computer such as a computer in an internet café. Also, the macro can be shared easily between users, by a first user defining access restrictions on the macro that permit other users (e.g., users who access the system from the same domain as the initial user) to run the macro when using their own applications. Also, the macros can be executed for a user even when the user is not on-line, such as when an input external to the user and the user's computer triggers macro execution. Moreover, when the hosted system has multiple registered users who are related to each other (e.g., they all work for the same business organization), macros running in a hosted system can produce complex workflows that span across applications and/or data stores that correspond to multiple of such users.

As noted, macros may be triggered by external events, such as the receipt of an email message. Macros may run on a macro server sub-system that is separate from a user's client system and separate from any sub-system on which other services or applications are running. For example, services on other sub-systems may include anything that the macro accesses to get information, including internal services to the main system (e.g., location services and email services) and third-party services (e.g., from commercial on-line stores or auction sites, weather sites, and the like).

A macro server sub-system associated with the system may allow the user who writes macro code to write macros in a unified and consistent way, making the programming experience easy for the end user. For example, an object model may be defined for the different services that are exposed to the end user, such as manipulating spreadsheets and a calendar, fetching web content, sending emails, accessing their calendar, translating text, etc. The object model may be represented using, for example, Java objects. Each Java object may wrap an access method to the underlying service. Spreadsheets and language translation services may use internal direct network calls (e.g., remote procedure calls), and web content fetching may use, for example, SOAP or similar services. Many of these services need not be exposed directly to the end user.

The system 100 may eliminate the risk of exposing internal services to end users, by creating several layers of "wrappers" or "decorators" around the underlying Java objects. For example, the system 100 may include a quota enforcing layer, which limits the number of times a given service may be called by a given user. The system 100 may include a security layer, which may use capability-based security, allowing fine-grained access control (for instance, allowing read access but not write access to underlying data). The system 100 may also include a logging layer which may capture all user calls and provide a transcript of their session. Where quotas and security are applied uniformly, and not ad-hoc across services, the chance of a programmer error (and resultant security breach) may be reduced.

The system 100 may include various computer-implemented mechanisms for managing computer macros, where the code is stored for a macro at a location in an Internet-accessible hosted computer system and operable to perform the following functions. Upon receiving a request to execute the macro, such as from an application that is running on a client computer remote from the hosted computer system, the macro may be executed on the hosted computer system. For instance, the macro may run directly inside a macro manager or its communicatively-coupled components. The results of executing the macro may be provided to the application that is running on the client computer (e.g., a spreadsheet application that is running in a browser on the user's computer) The code for the macro in this situation may be stored and accessed apart from documents on which the macro is programmed to operate. For example, while the code may execute on the hosted services servers, the spreadsheet updated by the macro code may reside on the user's laptop computer or in another location at the hosted service, where the macro is free to be pointed to and accessed from any number of applications running on behalf of any number of users who are registered with the hosted service.

In some implementations, each macro may be associated with a registered user of the hosted computer system, and the macro may be made available to other users of the hosted computer system according to access restrictions identified by the registered user (or more specifically, to applications run on accounts of the other users). For example, the user who "owns" a macro may identify other users who are authorized to use his macro, via their user IDs or via groups to which those users belong. In other cases, the user may provide a link or URL to the macro and include certain rights associated with running the macro.

Access restrictions can be defined by one or more groups to which the registered user is assigned by the hosted computer system. For example, the user may grant macro access to a group named "MyOnlineFriends" and assign rights to all people in that group, which may represent his "friends" identified on his social networking site (e.g., Facebook, Orkut etc.)

In some implementations, requests may be received to execute the macro where the requests originate from multiple applications running on multiple different client computers remote from the hosted computer. For example, the applications may generate or fire "events" which, in the definition of the macros, are designed to start the macro's execution, or to resume or continue the macro's execution after being in a wait state. The system 100 may automatically execute the macro on the hosted computer system for each of the requests from the location. The system 100 may further provide results of executing the macro to each respective application of the multiple applications in response to executing the macro. In some implementations, the multiple applications correspond to a single accountholder. For instance, each application that requests execution of the macro may receive the results. In some implementations, the multiple applications correspond to multiple different accountholders (e.g., multiple registered users of the system 100).

Executing a macro can include making calls to multiple different hosted services provided by the hosted computer system. For example, a macro may call a calendar service, a contacts service, a location providing service (e.g., a service that indicates a location of a user or friends of the user), and so on. Executing the macro can, alternatively or in addition, include making calls to web services provided by third-party information providers that are independent of the hosted computer system (e.g., that are at a domain that differs, and that are operated by an organization that differs, from that of the hosted computer system).

Information generated by a first application that is executing on the hosted computer system may also be translated from a first format to a second format, and the translated information may be provided to a second application that is running on the hosted computer system. For example, data may be created in comma-delimited format by a word processing application, and the data may then be provided to a spreadsheet application for pasting into spreadsheet cells in format specific to the spreadsheet application.

The results of executing a macro can also be provided automatically to multiple different accounts for multiple different users who are registered with the hosted computer system. For instance, macro execution results may be provided to several users on several computer systems, such as to update a common spreadsheet cell on each of their systems. In some implementations, a request to run a macro is received in response to a browser on the client computer loading a web page having a pointer to a JavaScript macro on a macro execution sub-system in a hosted computer system. For instance, when macros are shared by passing links or URLs to the macros, a request to execute the macros (e.g., in JavaScript or any other relevant language) may be provided in the form of a link or URL.

Referring now more particularly to FIG. 1, and as an example for implementing some or all of the functionality just discussed, the system 100 includes one or more applications 102 (each having access to a macro hook 104, which causes the execution of a macro when it is accessed), one or more external events 105, a macro server sub-system 106, a social network 108, a location service 110 and macro code 112.

The applications 102 may include any applicable applications that a user may cause to run or execute, such as email applications, spreadsheet applications, word processing applications, photo sharing applications, presentation packages, financial planning applications, etc. In some cases, the user may start an application explicitly by selecting the application to run, such as by double-clicking on the application name on a desktop or in a pull-down list of applications. Other applications may be started implicitly, such as when a user clicks on an email attachment (e.g., a text file or a spreadsheet), or when a user clicks on an unknown file, either of which may automatically start execution of the corresponding application associated with the file, such as based on the extension name of the file or other defined association. A user may also start an application by navigating to a URL that is directed to the application, such as a hosted application.

In yet another example of starting or executing applications, an event 105 may occur, such as the receipt of an email message, which may start or resume the execution of certain applications. For example, the event 105 (e.g., a received email message) may trigger a macro (e.g., to update a spreadsheet, adding the subject line). The occurrence of the event may be detected by an event handler that runs on a hosted system and that tracks events for each of the users that are registered with the system. Each event may be reported, may then be correlated with a particular action such as the execution of a macro, and the action may be triggered.

Each of the applications 102 has access to a macro hook 104. In the simplest of implementations, the macro hook may simply be a URL that points to code for the macro stored on, and executable on, the system 100. For example, the hook 104 may be a URL that points to JavaScript code, and may be included in a web page, so that when the web page loads or a certain event associated with operating the web page occurs, the code may be accessed and run. In addition to facilitating the definition of macros within that application 102, or alternatively, the macro hook 104 may perform event tracking and provide a connection between external events 105 and the macro server sub-system 106. For example, the macro hook 104 may allow the user to define macros associated with events related to emails received in an email application 102. The macro may identify objects that are different from what the email application 102 may provide. Moreover, the macro code 112 of the macro may be in a different language than the native language of macros in the email application 102. The macro hook 104 may also track any events related to that macro, and may interact with the macro server sub-system 106 at the proper time. The macro hook 104 may be instantiated or realized by the user by selecting an option to record a macro or execute an existing macro.

External events 105 may include a variety of events for triggering the execution of a macro, including the receipt of an email message (e.g., in an email application), the determination (e.g., by the application) that certain conditions exist (e.g., quotas exceeded, user access is denied, a process has completed, etc.), and so on. Such events may be tracked by an event handler, and particular events to be tracked may be registered with the event handler for each user who desires that a macro or macros be executed upon the occurrence of a particular event in the system 100.

In some implementations, events may be trapped within code, such as when a line of code determines that certain conditions are met (e.g., a variable has reached a certain value, or accounting updates are done for the night, etc.). External events 105 may also include a detection of a message such as a text message, a blog entry, an incoming RSS feed or the like. External events 105 may include the detection of a posting of a particular item on an online auction site, as may be determined, for example, by the title or description of the auction item (e.g., "vintage Vatican license plate").

A triggering condition for an external event 105 may include different combinations of conditions. For example, conditions that are used in triggering events related to email applications may include email subject lines, sender IDs (e.g., boss, spouse, children, etc.), recipients (e.g., using combinations of "To" vs. "Cc" vs. "Bcc"), the number of recipients (e.g., tell me when I am the only recipient, etc.), whether there is an attachment, the location from which the email was sent, keywords in the message body, or whether the email is likely to be spam. Conditions that may correspond to word processing applications may include the size of the document, the document's source, the document's creation date and/or most recent date of modification, the author of the document, and so on. For spreadsheet applications, conditions that may be use used for triggering events include the value of a particular spreadsheet cell, whether a cell's value has changed, the number of rows or columns of actual data in the spreadsheet, the spreadsheet's author, the spreadsheet's size, etc. Conditions that apply to other types of documents may include whether a change has just occurred to that document. Other triggering events may be generated by sources or services on the web, such as, for example, an alert posted by an online weather services site warning of a tornado heading toward a particular town. In such a case, a weather-cautious user may have already constructed a macro to intercept the external weather-related event and generate texts and/or phone calls to his family or neighbors.

The events may also be combination from a number of different sources. For example, an initial event may be triggered initially by the receipt of an email from a particular user, but a macro may only be executed after that event occurs and it is determined that the user sending or receiving the email is in a particular location, using a location tracking service. Additional or alternative conditions using information from other services may also be imposed.

The macro server sub-system 106 may monitor for particular events in the system 100, such as events that are propagated by the applications 102 (e.g., email messages, etc.). The particular events of interest to the macro server sub-system 106 may include any relevant events that may be addressed by a macro, in addition to events that may serve as instructions to the macro server sub-system 106 (e.g., "suspend communication with server XYZ, application ABC or user John Doe until further notice").

Various services can interact with the system 100, either by being triggers for events, input for macros running in response to triggers, or outputs from the macros. For example, a social network 108 may provide information to the system 100 that is useful for determining how to handle events. As one example, a macro may be defined to perform an operation upon receipt of an email sent to Betty, but only if the email is from one of Betty's friends (e.g., as defined on one or more social networks). In another example, a macro may be designed to send automatic emails or other notifications to all of Betty's "friends" (e.g., as defined by social networking sites or groups). The organization that runs the social network 108 may be different from the organization that runs the sub-system 106, the operator of the former system 108 may provide access to certain information via an API, and to the extent that the operator of the sub-system 106 has been given such access.

As another example, a location tracking service 110 may, when invited by users, track the location of mobile devices associated with the users, such as so that users may find their friends and vice-versa. For example, macros may be defined to send the user an email or text, and the destination of the email or text may depend on the user's location at the time. For instance, if the user has a cell phone or other mobile (e.g. GPS-based) device, the user's location may be tracked or known by the location tracking service 110. Depending on the user's location, an email that is propagated by executing the macro may be sent to the user's mobile device or to a device at home (e.g., if the user is nearer to his house or if the location service 110 determines that the user is probably headed in that direction).

In addition to "where am I?" location information sent, for example, from the user's GPS-enabled device, the user may also receive "where should I go?" information through the location tracking service 110. This information may include, for example, GPS coordinates or simple text messages (e.g., "turn here, and then go up the hill to 10107").

The sub-system 106 can stored, track, access, share, and execute various instances of macro code. The macro code 112 that makes up macros may be in any appropriate language, but may typically be written or programmed in the preferred macro language (e.g., JavaScript, etc) used by the system 100. As a macro is executed in a familiar manner, the macro server sub-system 106 may parse (or search for) function- and macro-related segments of the macro code 112, such as a "get name" function 114, a "check name" function 116, a "get location" function 118, or any other functions or macros that the macro server sub-system 106 is to consider. Each of the functions or operations embedded in the macro code 112 may cause the macro server sub-system 106 to perform different types of processing, such as to check user authorization to access a file, etc.

The macro code 112 may be stored in a variety of locations, such as a central macro repository or in an Internet-accessible hosted computer system. In some implementations, the entire collection of macro code 112 may be stored in a distributed manner and logically tied together by one or more networks. In some implementations, when macro code 112 is sensitive (e.g., it contains or updates users' personal information) or classified (e.g., Secret, Top Secret, etc.) for reasons of national defense, the macro code 112 can be explicitly stored in a separate location, such as on secure servers.

In some implementations, "listeners" can be used for event tracking. For example, when a spreadsheet is loaded on the server and its HTML is sent down to the browser, it may trigger a server-side event that indicates that a new spreadsheet has been opened. A listener on the spreadsheet server for this event may then check to see if it has the list of scripts for that spreadsheet. If not, it may make a call (e.g., to a script server), saying, in essence, "are there any scripts for this spreadsheet?," and passing the spreadsheet key, then storing that list of scripts. The event handler on the spreadsheet server may then check if any of the script methods are called "onOpen". If so, it may send a message (e.g., to the Google Apps Script server) to execute that method. This flow may also be used in other scenarios, such as edit events, etc.

In another example, a macro may be associated with an email application that has been set up to perform certain message routing that depends, for example, on the subject line, the email's sender, whether there is a very large spreadsheet attachment to the email message, whether there is an attachment (of any kind), and so on. A macro that is defined in such a manner may also use location information, such as provided by the location tracking service 110. If, for example, an email message that is destined for the user's work email has a large spreadsheet attachment and the user is determined to be at home (because GPS signals from their mobile device correspond to a location that has been registered as the user's home), the macro may be established to forward a copy to the user's home email. In such a situation, the attachment may likely be a work-related spreadsheet that needs review for a presentation or project at work the next day. Alternatively, for those instances in which the user may be discovered to be located nowhere near his house, the macro may be established to send a small message to the user's mobile email-enabled device, alerting the user that the email exists.

In either case, the macro code 112 may be stored on the macro server sub-system 106, removed from any email application 102 that causes the macro to execute. For every incoming email message received, the email application 102 may trigger the macro by pointing to the macro code with the hook 104. The macro may then identify various aspects of the message, such as whether a particular sender is a member of the accountholder's social network. If the social network check results are positive, the macro may further check a location tracking service 110 to determine a geographic location of the sender or of the accountholder, and may cause certain actions to be performed based on such locations. For example, the macro server sub-system 106 could notify the accountholder, in certain situations, based on the location of the accountholder (or user). In other cases, the macro server sub-system 106 could cause the accountholder to be called (e.g., via a universal call routing system that uses VOIP), and/or cause an SMS message to be sent, or other actions defined by the macro.

The macro may obtain and provide such information by accessing the various applications that run on the system 100, via one or more acknowledged API's. Where there are multiple different API's a translation service may be provided with the sub-system 106 so that authors may write for a single macro language for the sub-system 106, while still working with disparate applications.

Several benefits may result when macros are hosted on a macro server sub-system that is separate from users' client computing devices. For example, macros can be used across many different applications. Also, the macros can be triggered while the user is on-line from various access points such as their desktop computer, someone else's computer, a net book or a smart phone, and the macro can be triggered even when the user is not on-line or at their computer. Such a macro may be defined to intercept an event in one type of application (e.g., email) and update data in another application (e.g., spreadsheet, where subject lines of incoming email messages for a user are compiled in a spreadsheet automatically).

Another benefit can be the ability to completely share macros between users without having to manually copy them. Instead, one or more security levels may be set on each macro, allowing access to other users as determined by the user who created or first saved the macro. For example, the user may set an access security level for the macro and provide the URL of the macro to another person, just as may be done, for example, for common web properties such as on-line photo sharing sites.

Macros hosted on a macro server sub-system can also, in certain instances, have the benefit of providing the ability to run a macro against data from a variety of users, or to provide the results of running a macro with a variety of users. For example, a shared macro may be used to combine contributions by several authors into a larger volume, such as poetry or articles written by several people. Each contributor's document may be saved in a predetermined location, and the macro may access it if the contributor has provided access to that location. The combined volume may then be made available as a single document to each of the contributors and perhaps additional users. As another example, a business workflow application could be created using macros on a hosted sub-system, such as to route a document for approval, where the document is at all times stored locally on the server system.

Figure 2:
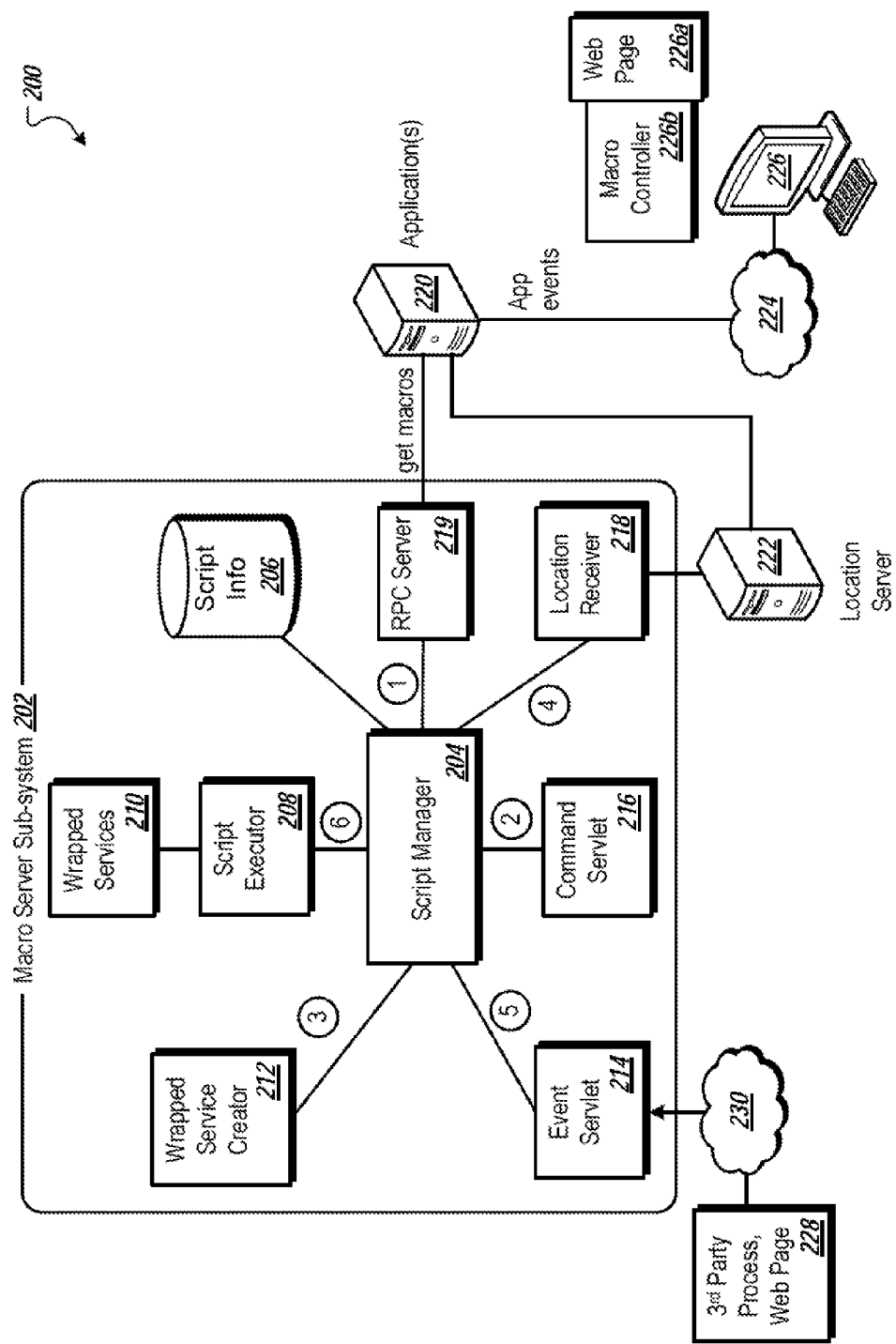
FIG. 2 is a schematic diagram of a hosted computer system capable of operating shared macros.

FIG. 2 is a schematic diagram of a hosted computer system 200 capable of operating shared macros. In general, the system 200 provides various components that show one example of a manner in which macros can be created by users, saved, shared, accessed, and executed on a hosted system.

In this system 200, a macro server sub-system 202 provides a location for saving macro code in a persistent manner in a script information storage data store 206, where the saved information may include a macro library name, script contents, and an identifier of a macro owner (e.g., using an obfuscated user ID or other identifier). When a macro is run, a command may be sent to the macro server sub-system 202 to execute the given macro. The code may then be retrieved from the script information storage data store 206, and an instance may be created in a script engine, or script executor 208.

Java objects representing the programmatic API for different server-side applications can be constructed, and can be wrapped in a capability-based security wrapper, and become programmer-visible wrapped services (or "beans"). The wrapped services 210 may include all of the relevant services that the macro server sub-system 202 may serve, for example, to consumers of wrapped services related to macro execution. A wrapped service 210 may be any relevant object that is a collection of other objects, packaged so that they may be passed around easily.

The wrapped services may include a Java business delegate that exposes public methods that interact with backend services. The public methods may be included in packages or other mechanisms for packaging methods, classes, strings, spreadsheets, application programming interfaces (APIs), and other tools provided by various computer languages (e.g., Java, etc.). The public methods may expose (or make public) resources, for example, that may be used to define and execute macros. Certain details of implementation of the public methods may be held private, which may provide suitable levels of information hiding and abstraction. The public methods may look similar across several different types of objects, exposing a somewhat consistent look and feel to macro users, and thus providing a level of polymorphism. As a result, the collection of wrapped services may facilitate the use of macros by users in an object-oriented, event-driven environment.

These wrapped services, or beans, are attached in this example system 200 to a top-level Java object that has public members for each property (e.g., spreadsheets, calendars, etc.) This top-level Java object is inserted into the scope for the environment of the script executor with a standard and predetermined label. In some implementations, the script executor reflects public members (and only public members) to the scripting environment.

Therefore, when a user's JavaScript code executes var doc=google.spreadsheets.create("my new doc"); (1)

the "create" Java method on the Java object in the "spreadsheets" field of the top-level object is called. The Java implementation of this method makes a remote procedure call to the spreadsheet server, with a "CREATE" command and an argument corresponding to the new title (e.g., "my new doc"), along with an obfuscated identifier of the script runner. The spreadsheet server creates the new spreadsheet and returns its key in the response to the remote procedure call. The macro server creates a new Java object representing the newly created spreadsheet, containing the new key. The Java object includes methods for several spreadsheet operations, such as "rename", "insertSheet" and so on. That object is also wrapped in a capability-based security wrapper and returned. The script executor internally wraps this object into a NativeJavaObject wrapper, and returns it to the variable "doc" above.

In some implementations of wrapping objects, any appropriate service (e.g., spreadsheets, calendar, email, etc.) may return objects that are wrapped in Java dynamic proxies. Distinct proxies may exist, such as for security, logging, and quota. Each proxy may incorporate or use a description of what service it is exposing (e.g., a Java interface, such as "Spreadsheet", "SpreadsheetRange", "EmailService", etc.) which may define the public methods. Annotations may exist on the interfaces, appropriate for the different wrappers.

For example, the "create" method on the spreadsheet service may create a new spreadsheet. It may have one annotation that declares that the method is a WRITE method, providing a mechanism, for example, to warn the user that the script will attempt to write to their collection of spreadsheet documents (and the script will fail at runtime if the user has not authorized a WRITE privilege for the script). Basically, the security wrapper helps to ensure that a given method's declared required permissions (WRITE, etc.) are in the user's authorization token. If the method is authorized, it passes the call to the next layer.

Security may also be provided by limiting the number of times a particular user can access an operation with respect to a macro. To perform such functionality, a quota annotation can exist on the "create" method, saying that calls to this method should be counted against the end user's "create spreadsheet" quota. The quota wrapper may call or use a quota service that keeps track of how many times a given user causes an operation to be performed. The method may fail, for example, if the user is over quota; if not, it again passes it down to the next layer. The quota for a user may be measured across a set time period, such as a day, a week, or a month, and may reset or decrement at periodic points in time.

A transcript of the macro executions may also be provided by a logging layer that records a string version of each method called, and the arguments provided.

The wrapped service creator 212 may create top-level wrapped services, the extent of which depend on the macro and its environment. For example, the wrapped service creator 212 may examine the capabilities that the end user who is running the macro has explicitly granted the macro, and may create top level beans corresponding to the state of the macro. The state may include, for example, the current document (e.g., email, text document, drawings, spreadsheet, etc.), if any, and user authentication. The wrapped service creator 212 may generate top-level wrapped services, having a capability that is based on the environment, and may inject the wrapped services 210 into the script executor's 208 execution environment where the user can, for example, define and execute macros. In a sense, the wrapped service creator 212 may be thought of as a producer or factory for beans, or a "bean factory."

The types of wrapped services 210 that may be created include, for example, capability-wrapped instances of spreadsheet applications, calendar applications and so on. This Java object may be inserted into the execution scope. The source of the object may be used to identify it (e.g., with the label "TopLevel"). Hence, "TopLevel.spreadsheets", for example, may become a reference to the capability-wrapped object (e.g., the SpreadsheetApplicationApi object). The object's public methods may be reflected as Java objects into the JavaScript programming environment and may be made available for macros.

For example, JavaScript code such as:

var doc=google.spreadsheets.getActiveSpreadsheet( );

var otherDoc=google.spreadsheets.openByName ("MyOtherDoc");

var value=doc.find("A1").getValue( );

otherDoc.find("B2").setValue(value); (3)

may open an existing spreadsheet (e.g., a spreadsheet called "MyOtherDoc") and copy the value of cell A1 from the current spreadsheet to cell B2 of the new spreadsheet. Java objects such as a Range object returned by a "find" method are capability wrapped, as are all others, and may fail if the authenticated user does not have access to the relevant spreadsheet. For example, in the copy/paste cell example previously presented, accesses required for successful execution are read access (e.g., required by getvalue) on the active spreadsheet, and write access (e.g., required by setValue) on the target spreadsheet (e.g., the spreadsheet "MyOtherDoc").

The script executor 208 may be responsible for creating a context for the macro and performing the actual insertion of the top-level wrapped service 210. A new top level scope may be created for each macro execution, such as to prevent the possibility of one executing script "poisoning" the global scope for other scripts. The macro context may be loaded with an implementation of a class shutter or filter, which prevents the creation of any Java classes that are not approved (e.g., not on the white-list of allowable classes). Additionally, the script executor 208 may create an instruction counter for throttling runaway scripts, such as to detect when a script has entered an infinite loop. In some implementations, runaway scripts may be terminated prematurely by the script manager 204.

The script executor 208 may be responsible for various functions, including parsing, checking syntax, function calls, macro execution and resumption. The parse function may examine a script and return a list of functions and macros discovered in the script storage in a data store, such as the script information data store 206. For example, referring to FIG. 1, the functions and macros detected as a result of the parse function may include the get name function 114, the check name function 116, the get location function 118, or any other functions, macros, etc. that may be embedded in the script or macro code (e.g., macro code 112).

Other functions supported by the system may also be used to help manage a collection of macros on a server-side system 200. For example, a syntax checking function can, before storing a script, determine if there are errors in the script (e.g., syntactical errors, language-compilation errors, misuse of keywords, etc.) in it. If syntactical or other errors are detected, the errors may be communicated, alerting the user or script programmer.

A call function may "call" (or start the execution of) a function in a macro. This call function may be a limited version of executing the macro, such as a version that has privileges granted for in-cell (e.g., in a spreadsheet) function calls. For example, limited versions of macros may be limited to only returning a value, while not be allowed to create side effects.

Macro execution and resumption functions may be used to start and resume macros. For example, the macro execution function may start the initial execution of the macro. In some cases, execution of the macro may require additional input from the user. In this case, execution of the macro may suspend, or enter a wait state, pending input from the user. Once the user input has been provided, the resume macro function may continue the execution of a macro that had been halted.

The script information repository 206 may serve as a data store, providing and/or supporting operations such as script/macro creation, storage, retrieval, update, deletion, etc. Scripts stored in the script information repository 206 may be organized by user library, individual script, or application (e.g., applications for email, spreadsheets, word processing documents, etc.). Operations may be performed on an entire user's library, or on individual elements in the library. For example, one operation may retrieve a user library by its ID (e.g., a primary key lookup based on the name of the library). Another operation may retrieve all user libraries linked to a given document, such as a document representing a macro or script.

Retrieval operations provided by the script information repository 206 may include operations that retrieve the authorization for a given user on a given user library, retrieve all user libraries owned by a given user, retrieve a continuation record by its ID, etc.

Creation/update operations provided by the script information repository 206 may include an operation to create/update a user library, an operation to create an association from a library to an abstract object's key (e.g., a document ID), an operation to create/update the authorizations for a given user on a given library, an operation to create a new continuation record (e.g., with serialized binary data, for a given user) and library and other creation/update operations.

Operations provided by the script information repository 206 that perform deletions may include an operation that deletes a continuation record, an operation that deletes an association from a library to an abstract object, and an operation that deletes a library, removing all child objects, including child objects associated with authorization and link continuation. An example logical structure of the script information repository 206 is described below with respect to FIG. 5.

The script manager 204 may delegate commands to the underlying components 206 through 219 of the macro server sub-system 202. Descriptions of specific example commands follow, and the delegation control paths to the underlying components 206 through 219 are marked with a series of lettered process arrows 1 through 6, which are generally lettered chronologically, though certain actions may occur in another order where possible.

One command that the script manager 204 may perform (e.g., by delegation) is to store a user library. The command may be limited in its execution, for example, based on the user privileges or other security. For example, if the user library representation (e.g., a protobuffer or protocol buffer) contains a library ID, the script manager 204 may ensure that the executing user is allowed to modify the library. If authorization occurs, then the script manager 204 may write it to the storage layer and return the new representation of the library. If no ID is present, a new ID may be created, and the representation containing the newly generated ID may be returned. Storing a library may involve, for example, parsing the functions in the library (e.g., using the script executor 208), adding the functions to the library DAO object, detecting syntax errors (e.g., using the script executor 208), storing the library content, and storing the owner. Referring to FIG. 2, the components involved in storing a user library may be indicated, for example, by process arrows 1, 2 and 6.

Protocol buffers, for example, when used for the user library representation, may include a data structure which can be serialized over the wire or persisted in binary form in a database. The data structure can use strongly typed fields in order to enforce communication protocols.

Another command that the script manager 204 may perform is importing a library. This command may create a link or other association of a library to a given document (e.g., a spreadsheet, an email calendar, or any other attachable context). For example, an email message may be associated with the user's given mail account. The purpose of the link is so that the underlying document may quickly discern which macros are associated with it, to display in "Run" menus, for example. For example, a library importing command may create a "Link" table entry in the data store. Referring to FIG. 2, the components involved in importing a library may be indicated, for example, by process arrows 1 and 2.

The copy command, which is another command that the script manager 204 may perform, copies an existing library, making a duplicate of its contents. For example, all of the scripts and macros contained in the library can be copied to a new library name. While the act of copying makes a duplicate of the library's contents, the associations are not copied. The newly created library's owner is set to the current owner. Upon completion of the copy operation, the ID of the new library is returned. For example, the copy command may create a new "UserLibrary" table entry in the data store, without copying over any links, continuations or authorizations. Referring to FIG. 2, the components involved in copying a library may be indicated, for example, by process arrows 1 and 2.

A delete library command can, for example, check for permission, then if allowed, it may delete the library from the data store (e.g., in the script information 206). For example, the delete library command may remove the entry from the "UserLibrary" table and all child tables. The front end may be responsible, for instance, to do any "are you sure?" interrogations. The components involved in deleting a library may be indicated, for example, by process arrows 1 and 2.

A command to get libraries by a user may return the libraries owned by a given user, based on the ID of the user. For example, the command may return the user library (e.g., in a UserLibrary or other table) entries stored in the script information 206 where the owner field is the current user. Referring to FIG. 2, the components involved in obtaining libraries for a user may be indicated, for example, by process arrows 1, 2 and 4.

A command to get libraries by document may return any libraries imported by a given document. For example, the get libraries command may scan the Link table for "documented" fields that match, and return the parent "UserLibrary." Referring to FIG. 2, the components involved in obtaining libraries for a document may be indicated, for example, by process arrows 1, 2 and 4.

A categorize library command may add an association to a "virtual" document, such as "SAMPLES.". For example, the categorize library command may create an entry in the Link table with the given name (SAMPLES, etc.). Referring to FIG. 2, the components involved in categorizing a library may be indicated, for example, by process arrows 1 and 2.

A get libraries for category command may return all libraries with a given categorization. For example, the get libraries for category command may be similar to getting libraries for a document. Referring to FIG. 2, the components involved in searching libraries by category may be indicated, for example, by process arrows 1 and 2.

An evaluate function command may retrieve the function from the library and pass it to the script executor 208 for execution. Referring to FIG. 2, the components involved in evaluating a function may be indicated, for example, by process arrows 1, 2, 3, 5 and 6.

An evaluate macro command, when provided input parameters (e.g., library ID, macro name, and contextual information about the current document, if any), may create the programmatic beans with wrappers and pass wrapped services to the script executor 208 for execution. Referring to FIG. 2, the components involved in evaluating a macro may be indicated, for example, by process arrows 1, 2, 3, 5 and 6.

A continue macro command, when given a macro library ID and continuation ID, may invoke a continuation operation on the script executor 208. For example, such a command may cause a paused executing macro to continue actively executing. Referring to FIG. 2, the components involved in continuing a macro may be indicated, for example, by process arrows 1, 2, 3 and 6.

An update authorizations command can, for a set of authorizations for a given user and a given macro library, update (or add) an entry in the data store. Referring to FIG. 2, the components involved in updating authorizations may be indicated, for example, by process arrows 1 and 2. In some implementations, "get library" and other commands may typically act only on the script storage layer, and not invoke the script executor 208.

Referring now to another component of the system 200, the command servlet 216 may cause macro commands to be executed by responding to requests from a macro controller (e.g., the JavaScript macro controller "MacroController.js"). The response may occur as a redirection, such as a redirection that is transparent and automatic to a user. In one example redirection technique, at the time a browser client make requests to a specific URL, a redirection rule may direct the request to the macro server, such as the macro server sub-system 202. The types of requests that the command servlet 216 may handle include, for example, several requests with names such as, GET_ADMIN_PANEL, SET_SCRIPT, etc.

For example, a GET_ADMIN_PANEL request may return the full HTML of the macro admin panel, and the macro controller (e.g., MacroController.js) may insert the HTML into a closure dialog. A SET_SCRIPT request may send the script content and user library ID to the command servlet 216. The command servlet 216 may invoke the script manager 204 to create/update the user library, which may result in returning the HTML (e.g., generated by a GXP) for the left hand side of the panel (containing the categories and library names). The macrocontroller.js may render that HTML in the div for the left hand side panel.

A GET_SCRIPT request may fetch the script content for the given library from the Script Manager, and may return a content pane (generated via GXP) for editing that script. The macrocontroller.js may put that HTML into the content div of the panel.

An IMPORT_LIB request may invoke the ScriptManager with an import library command. The request may render the left hand side of the panel via gxp and return it to the macrocontroller.js.

A COPY_LIB request may be similar to the IMPORT_LIB command, but uses a copy command rather than an import command. A DELETE_LIB request may be similar to the IMPORT_LIB, but may use the delete command, for example, so as to return the entire admin panel HTML via gxp. A CATEGORIZE_LIB request may be used as an "add to samples" feature. Like import_lib, CATEGORIZE_LIB may invoke the Script Manager with the categorize lib command and returns the left hand side of the panel for redrawing.

A RUN_MACRO request may take a macro name, library id, and serialized representation of the state of the document (e.g., current selection, etc), and invoke the script executor 208 to execute the given macro. If an error occurs, an error message is thrown back to macrocontroller.js for display to the user. If the user has to authorize the macro, a message may be sent back to the macrocontroller.js to prompt the user.

The macro server sub-system 202 interacts with applications 220 and a location server 222 through a network 224. The applications 220 may be applications being executed by a user employing a user device 226, such as a web browser running on the user's laptop computer. The user device 226 may display, for example, a web page 226a (e.g., using a spreadsheet server). The user's web browser may employ a macro controller 226b in order to control the execution of macros on the user's user device 226.

External events from third-party processes and web pages 228 may serve as the triggering mechanisms for macros that are defined within the macro server sub-system 202. The external events may be received via a network 230, such as the Internet. The external events here may correspond to the external events 105 described with respect to FIG. 1.

The external events, in addition to internal events, such as location information received by location receiver 218, may be tracked and reported by event servlet 214. The event servlet 214 may implement a server-based event registry that serves as a communication hub for events occurring in the system 200.

The event registry may be accessed by interested or subscribing processes, such as macro-related processes, that are running on the system, and may provide alerts to such processes so that the processes can b instantiated when certain events occur. To do so, the event registry provides methods that are callable by consumers of events. The event registry may expose various methods such as a "listen" method, an "unlisten" method, and other methods that may be used to manage events.

The listen method serves as the basis for event monitoring and tracking within the system and may have arguments or parameters such as a username, an event filter, and a target. Thus, one example format of a listen method call may be:

listen(userName, eventFilter, target);

Calling the listen method may inform the event registry to listen for specific events on behalf of an authenticated user (e.g., the user identified by the "userName") and route them to one or more specified targets (e.g., as identified by the "target" parameter) when they occur. The specific events may be identified, for example, by the event filter (e.g., "eventFilter" parameter). The event filter may include service identifiers (e.g., an email service, a calendar service, etc.) and other service-specific filters (e.g., "email receipt", "folder creation", etc). The target can be, for example, a remote procedure call (RPC) callback. For example, when the event fires or occurs, the event registry may send the event details to this endpoint (e.g., the target). In some implementations, the target may be a component of the macro server sub-system 202, with an identifier that identifies which macro to run when the event triggers.

A corresponding "unlisten" method may be used to cancel a request to receive notifications about events. The call for invoking the unlisten method may take a form such as:

unlisten(userName, eventFilter, target);

Calling the unlisten method may be the equivalent of canceling or stopping a "listener." Again, the parameters for this command mirror the parameters that would have been used to initiate listening for the event in the first place.

Compound event conditions may also be applied by the event servlet 214. For example, an event filter may be defined so that a notification triggers only when an incoming email arrives and the recipient or sender of the email is in a certain location. Such a compound standard may be implemented by a separate macro—e.g., a macro that is triggered by the arrival of an email, and that then checks a location service for the location of the recipient or sender, and only continues to perform if the location matches a particular value. The standard may also be implemented by the event servlet 214, such as by providing processes that the servlet 214 can execute in order to gather information to determine whether compound conditions have been met, before notifying a subscribing service to start executing a macro.

In certain circumstances, event conditions may be aligned with each other, such as in a cascading or serial manner. For instance, the occurrence of an event may trigger the initiation of a macro by the event servlet 214 sending a message to the script manager 204. That macro may then run and provide outputs that implicate other events defined with the event servlet 214. In response, the event servlet 214 may send another message to the script manager 204 to cause the script manager 204 to initiate a different macro. In a similar manner, a single event may simultaneously trigger the execution of two different macros. For example, a user may wish to have one macro run in response to the receipt of any emails by the user's account (e.g., to strip subject information from the emails and place the information in a spreadsheet) and another macro run whenever an email is received from a user who is defined as a friend of the first user in a social network system (which may be separate from the system and organization that operate the sub-system 202) when that friend is within a certain distance of the first user. Thus, when an email arrives from such a friend in such a location, both macros may be triggered and executed at the same time in parallel.

Event notification may be initiated in several different ways. For instance, event notification may be initiated programmatically. In some implementations, an "installer" script or other program code may be created which programmatically registers event types with the event registry. For instance, a package tracking application within an enterprise may, upon deployment or initial installation, register event listeners on mailing lists which are operable to inform customers that packages have arrived, packages have shipped, shipping payments have been received, shipments have traveled as far as point X, etc. Additional actions within the script library (e.g., the package-tracking script library) could then automatically run when activity is detected on that mailing list. In this example of programmatic initiation, little or no end user intervention is required to "rig up" the event listeners because the listening is established up front, such as part of the installation of package tracking applications. In some implementations, additional user interfaces my be provided to adjust the listeners or define new listeners.

In another example mechanism for initiating event notification, a target application that provides events may create and expose its own interface to allow users to bind event types to particular script invocations. For example, some email applications (e.g., Apple's Mail.app) may use custom filters which the user may employ, such as to specify to run an application (e.g., AppleScript) upon the occurrence of particular events. Other applications (e.g., Gmail, etc.) may include filters which allow a user to define email attribute criteria (e.g., email contains string ABC, email is from/to particular addresses, etc.) and actions that are performed (e.g., archive email, label email, forward to address XYZ, etc.). Similarly, Gmail may allow the user to optionally add, for example, "run script XYZ" as one of the actions to be performed when the particular filter criteria is met. Other applications may use similar features, such as the change notification service in Google Spreadsheets, which is operable to email (to the user) a digest of changes to the spreadsheet. In some implementations, an additional option of invoking a macro may be provided as opposed to, or in addition to, sending an email.

Other methods may also exist for managing events, users and user accounts, event filters, and targets associated with an event registry. For instance, a user may obtain information about all events for which their account is currently listening (e.g., a list of their listeners) by using a getRegisteredListenersForUser method. The information may be displayed, for example, in a management panel or other user interface. Other event-managing methods may include methods to provide information for a specific userName, eventFilter or target, or combinations thereof.

An event registry implemented by the event servlet 214 may maintain a database of user/listener pairs. Upon receipt of a "listen" method or command, for example, the event registry may unpack the service filter and send a message to a corresponding service.

Each service may expose an RPC endpoint with a similar "listen" method, that contains user credentials and the event filter. The target for the service may be the event registry itself. For instance, a service may send events to the event registry when the service detects internally that a condition satisfies the event filter. The internal implementations (by each server) of this part of the process may be left up to the particular server, thus not mandating any particular internal implementation of this part of the system. Therefore, event broadcasters may implement this contract in a manner that is suitable to them.

When an event is registered (or detected) by the event registry, the event registry is responsible for unpacking the target information from its data storage and sending notification of the event to all relevant targets. Notification may include an identification of the event itself and any other pertinent information that the targets may need. In some implementations, the main target may be the macro server sub-system 202. In some implementations, other targets may be used, including, for example, notification services, logging services, web services, and others).

In some implementations, the system may be designed such that design concerns for different components are decoupled from each other. For example, an event registry may know about targets, while the event broadcasting services do not. Moreover, the event broadcasting services may know how to apply the event filters (e.g., "email sent," "spreadsheet cell updated," "item put in folder"), while the event registry does not. For instance, the event registry may only know how to locate service endpoints (e.g., for targets). This decoupling of design may provide the benefit of allowing future participants, such as third parties, freedom to implement their end of the system while not needing to worry about the specifics of routing to the N number of possible targets.

Regarding transport mechanisms, implementations may use any appropriate mechanisms for API calls, network transport protocols, etc. For example, some third-party participants of the event registry may use various web services (e.g., "SOAP") for many external API calls. Other participants may use a representational state transfer (REST) or other suitable API. Other participants, such as the organization that provides the sub-system 202, may internally use a proprietary network transport protocol. Each of these mechanisms, or others not listed here, may preserve the content and the semantics of the event flow.

In some implementations, methods used for user authentication may include, for example, OAuth or any other appropriate open standards for allowing one application to access a user's data on another application. For instance, the access may be allowed without the user having to provide passwords or other specific credentials. Specifically, when using OAuth or a similar method, a user could allow the event registry to call the event subsystem in various open applications. The call may use a token that each of the services can recognize. As a result, authentication may be constrained to the event system, for instance, while forbidding access to other services, such as sending email on the user's behalf (e.g., without the user's permission, etc.).

The content (or "event data") of each event may include, for example, a set of attribute/value pairs. For instance, a standard set of attributes may be defined (such as "user" and "service") for all applications in general. Further, each application may define additional attributes specific to its service. For example, a spreadsheets application may define the attribute "spreadsheet cell", an attribute that would not be useful for non-spreadsheet applications.

In some implementations, some or all filtering may occur in the event registry, rather than solely in the participating services, or in a mix of the two. In such a case, participating services may blindly fire all events to the event registry, which would perform the event filtering based on its store of listeners. While registry-based filtering may simplify or eliminate filtering in the participating services, such an approach could over-saturate a system in some instances.

The systems here may also permit a user to record a macro by instantiating a macro recorder, carrying out a number of actions that are tracked by the macro recorder, and saving a representation of those actions that the user can later invoke for automatic execution of the actions. Macro recording may be performed typically on the server side in this implementation. When a user executes a recordable command (e.g., setting a cell value, inserting a sheet, etc.), a command may be sent to the spreadsheet server. That server may note whether or not it is in "record" mode, and if so, may look up the command and write text into a running string buffer that corresponds to the scripting code that would have the same effect.

For example, consider if the user types "hello" into cell A1 of a spreadsheet. A command may be sent to the spreadsheet server, with a command ID that means "set range", a value of "hello", a row of 0, a column of 0, and a sheet-ID of 0 (e.g., if it is the first sheet). Note that this is not just for the recorder; this is the command that actually performs the change to the cell on the spreadsheet server, so this command is sent whether recording is occurring or not. The recorder thus may be essentially the equivalent of a wiretap on the existing command flow that makes the spreadsheet operate.

The recorder may look up the command ID and see that it is a "set range" command. Knowing that the appropriate code to generate is a "setValue" call on a "range" object, the recorder may look up and use the row and column to generate the corresponding text. The recorder may then look up and use the sheet identifier, determining if a variable for that sheet already exists. As a result, the macro recorder may generate text such as:

$$sheet.getRange('a1').setValue('hello'); \qquad (2)$$

Thus, by these structures, a computer user may log onto a hosted computer service and access a number of different applications and services. The user may explicitly choose to execute a macro, or the macro may be automatically triggered, and the macro may run in the application and other relevant applications that may be automatically instantiated if they are referenced by the macro. As a result, the user may have access to a wide variety of data and programming mechanisms to produce robust on-line services.

Figure 3A:
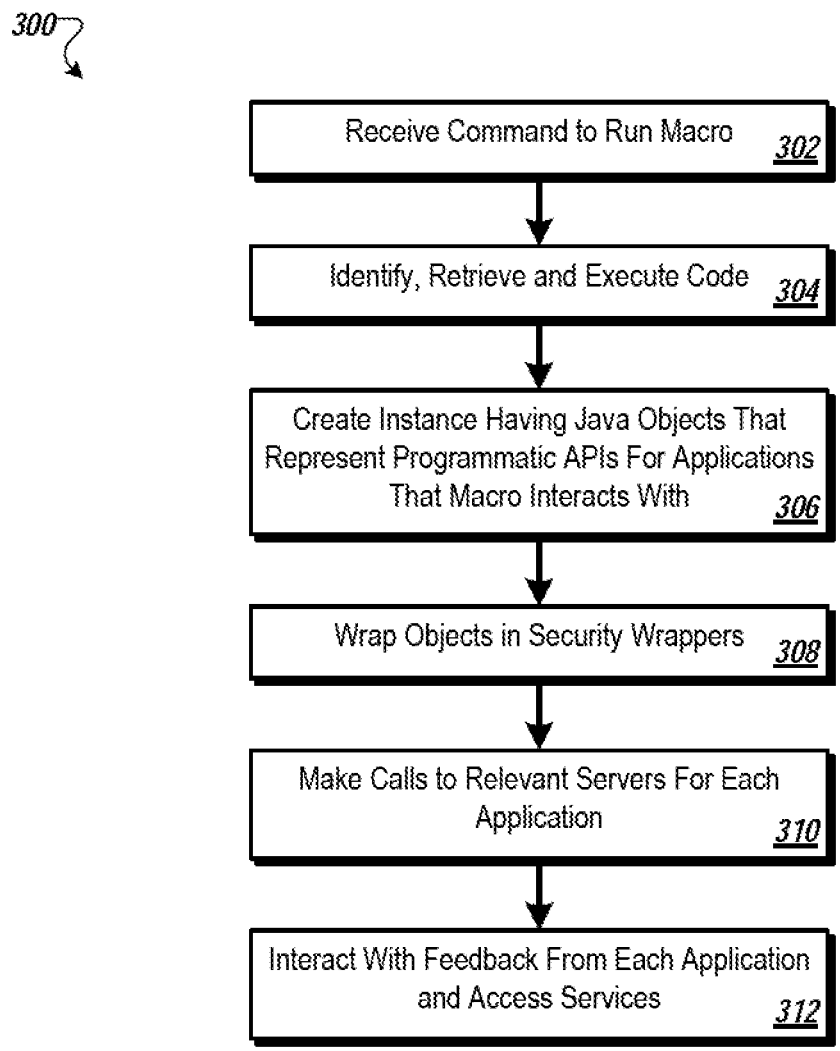
FIG. 3A is a flow chart of a process for executing a macro on a hosted computing system.

FIG. 3A is a flow chart of a process 300 for executing a macro on a hosted computing system. The process 300 may be used, for instance, for running macros in the systems 100 and 200. In general, the pictured process involves identifying the relevant macro code, creating objects to execute the code, and executing the code to interact with one or more applications on the hosted computer system.

The process 300 in this example begins at box 302, where a command to run a macro is received. The command may be the result of an external event 105, as described with respect to FIG. 1, or the user may manually select the macro to be run. For example, in the former case, the external event 105 may be the receipt of an email, and the macro commanded to be run may be a macro to perform an operation in response to receiving the email, such as updating a spreadsheet with the email's subject line. The macro hook 104 may be involved in detecting the external event 105, then once again responsible for triggering the macro to be run, such as by communicating with the macro server sub-system 106.

At box 304, macro code is identified, retrieved, and executed. For example, referring to FIG. 2, the script manager 204 may identify, to the script information 206, the macro code to be executed. The script information 206 may then return the requested macro code to the script manager 204, which then may initiate its execution.

As part of the execution of the macro code, an instance is created (at box 306) having Java objects that represent programmatic APIs for applications with which macro interacts. The APIs may correspond to the applications upon which the macro code interacts. For example, if the macro code is designed to update a spreadsheet, the instance that is created includes Java objects that represent programmatic APIs for the corresponding spreadsheet application.

The objects are wrapped in security wrappers at box 308. For example, the security wrapper may be additional code that surrounds the macro code itself, for instance, not allowing the macro code to run unless positive actions are taken by the user. In some implementations, the action may be to click "OK" or in some other way explicitly approve of the macro.

Security wrappers may protect the end user in various ways, such as from attacks from Trojan horses, phishing attacks, or other malicious code. In some implementations, the security wrapper may be constructed after delivering a dialog box to the user. The message included in the dialog box may identify the macro as a potentially un-trusted macro, and further identifying what could happen if the macro is run. The dialog box can, in some implementations, identify a list of potentially harmful acts that are specific to that macro, the list being based upon a scan of the macro. Scanning a macro can, for example, help to identify specific potential harmful effects, based in part on text strings in the macro or some other information corresponding to contents of past macros that have been malicious.

The user may approve or disapprove the access that the macro may have. The user's approval may be used to construct the capability-based security wrappers that are referenced above, such as allowing the macro to have read privileges, but not allowing the macro to update certain files. In this case, the privileges or rights granted to the macro by the user and reflected in the security wrapper are limited to those types of actions that the user has approved.

In some implementations, the process for generating security wrappers may detect malicious code that tries to mislead a mechanism for detecting malicious code. For example, instead of coding "delete" in a macro, substrings "de" and "lete" may be concatenated in an attempt to hide the true delete operation's intent (e.g., "delete"). The process described here may be programmed to identify such instances and prevent deletion where the user did not grant delete approval to the macro.

At box 310, calls are made to relevant servers for each application to which the macro is directed. The calls involve execution of the objects containing methods or other programmatic APIs that are associated with the applications upon which the macro interacts. For example, calls may include execution of macro code that updates a spreadsheet, forwards an email, copies a file, etc.

Interaction then occurs (at box 312) with feedback from each application and access services. For instance, the interaction may include user interaction with the application upon which the macro has just operated. The user can, for example, read (and perform other interactions with) the email that the user just received as a result of the macro that forwarded the email from another user.

In this manner, a macro may be executed on a central system across multiple applications that are run on separate sub-systems in the system. The macro may include security mechanisms, and may be triggered in a variety of manners. In addition, the macro may obtain information from a variety of different services that are accessible within the system or from other systems over a network such as the internet.

Figure 3B:
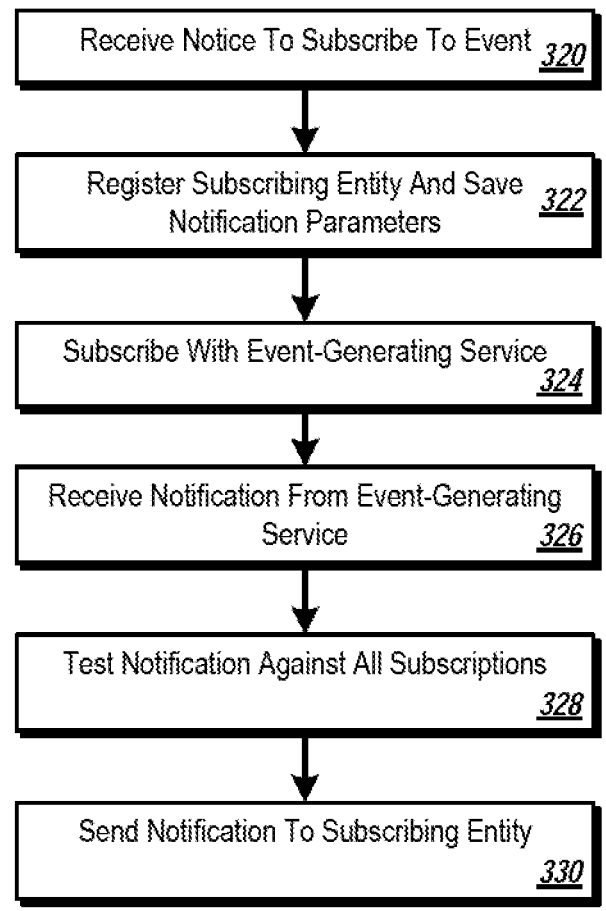
FIG. 3B is a flow chart of a process for managing event-triggered macros.

FIG. 3B is a flow chart of a process for managing event-triggered macros. In general, the process involves two phases: a first phase in which an entity subscribes with an event registry so as to indicate a desire to be notified in the future of events that match certain criteria, and a second phase during which events occur and the event registry notifies the appropriate entity or entities. Such phases may both be occurring substantially continuously in the process, with entities registering new subscriptions while other entities are being notified about events directed to previously-registered subscriptions.

The process begins at box 320, where an event registry receives a notice, from an entity, of an intent to subscribe to an event. The notice may arrive in a variety of forms, such as in a remote procedure call between an application for managing macro execution (e.g., script manager 204 in FIG. 2) and the event registry. The notice may include, as noted above, a username, an event filter, and a target. The username may correspond to an identifier for a user account in a hosted computer system that operates the event registry, the target may represent an address (e.g., URL) to which a notification is to be sent when a triggering event is identified by the event registry, and the event filter may represent one or more conditions that must be met by the event before the notification will be provided to the target. The entity that provides the notice may be any of a number of entities, including script manager 204, which, when a user establishes a macro that is to be triggered by a particular event, may provide notice to the event registry that contains a target directed to the particular macro so that the macro is run upon occurrence of the event.

At box 322, the registry registers the subscribing entity and saves notification parameters for the event. The registration may including saving information relating to the parameters received in the notice and can include associating such information with a registered user of a system so that the user can access and change information relating to the entry with the event registry. The remaining information may be stored in a location that it is readily available to the event registry so that it can be searched when events occur so as to determining which entries a particular event is related to.

In certain instances, the event registry can subscribe with an event-generating service that is associated with an entry in the registry. For example, the event registry can provide a user identification to a server-based application such as an email application, telling the application that it should reports certain types of events relating to a particular user account. For example, the event registry may inform the email application to report events relating to incoming messages for user John Doe. In this manner, the application can know when to report events, and need not supply all events that it faces to the event registry.

The second phase of the process begins at box 326, where the event registry receives notification fro the event-generating service. For example, an email application may indicate an event in the form of an incoming email for a particular user.

The indication may simply take a form of an identification number that the event registry provided when subscribing with the email application, and the event registry can use the number to look up the underling registration for which notification is required. Other information may also be passed, such as information that was defined in the original registration, and the event registry can pass such information to the subscribing entity, such as to script manager 204, so that the information can be readily accessed by a macro whose execution is triggered by the event. Alternatively, the macro can be programmed to obtain the information independently, and directly from the application. The event registry may be in constant listening mode, waiting for such notifications, and may handle many such notifications substantially simultaneously from many services, and may report the notifications out to many different subscribing entities, including macros or macro managing services.

At box 328, the event registry tests the notification against all subscriptions to the registry. Where the notification is a single identification number, the event registry can perform a look up that correlates the number to a data record that includes information such as the information originally provided to the event registry by the subscribing entity. Such information (e.g., a target address) may then be used to notify the subscribing entity (box 350).

In this manner, the process may conveniently provide a user with mechanisms for executing macros automatically and independent of a client device or a user status (e.g., whether the user is currently able to interact with a hosted system, and whether or not the user is currently logged into the system).

Figure 4A:
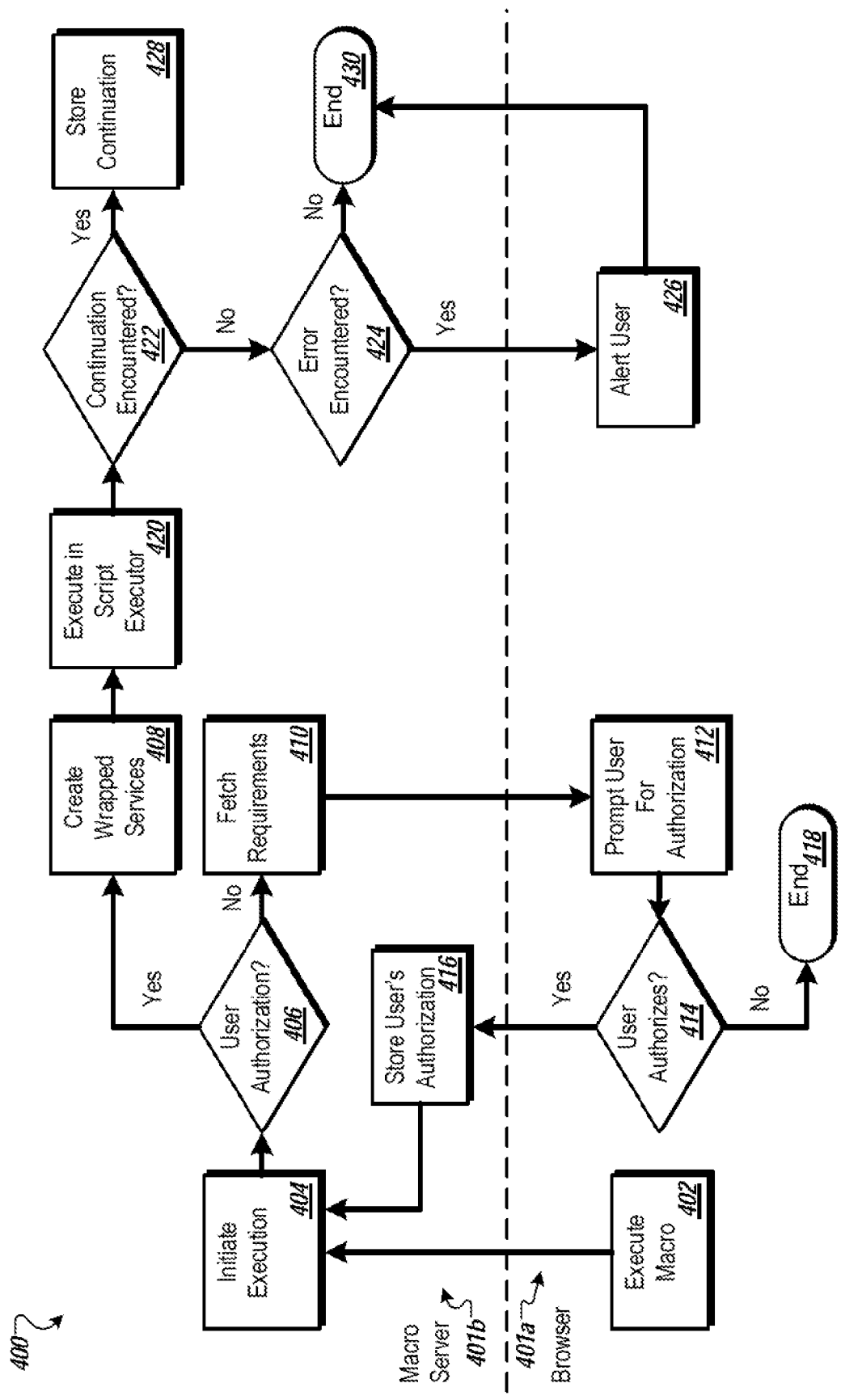
FIG. 4A is a flow chart of a process for executing a macro invoked from an application running on a web page.

FIG. 4A is a flow chart of a process 400 for executing a macro that is invoked from an application running on a web page. In general, the process includes In general, the process shown in FIG. 4A is similar to the process shown in FIG. 3A and shows examples for the manner in which the process can be shared among different components in a multi-component system.

The example process 400 includes steps corresponding to interactions between a browser 401a and a macro server 401b. For example, interactions at the browser side of the process may involve a user employing a client device that is running a spreadsheet application, while the executed macros may run at (and obtain data by) a data server system, such as the macro server 401b. The process 400 steps shown on the browser side are in addition to generic interactions, unrelated to macros, that may occur between the user and the spreadsheet application (e.g., provided by a spreadsheet server system). The process 400 steps performed on the macro server side may be performed, for example, by the macro server sub-system 202. The process 400 may also represent macro execution on the systems 100 and 200 described above with respect to FIGS. 1 and 2. In general, the steps of the process 400 in the macro server 401b side may be controlled by the script manager 204.

At box 402, a request to execute a macro occurs. For example, the request may originate by a user running a browser application on a client device. The user may execute a key combination to trigger the running of the macro, or the running may be initiated by the opening of a particular document in an application, a user selection of a control on the application, or by mechanisms apart from the user's interaction with the system, such as by an external signal being received by the sub-system.

At step 404, execution of the macro is initiated. The initiation can, for instance, occur within the macro server sub-system 202. For example, macro code corresponding to an address that may be passed or identified by the client device may be loaded on the sub-system and its execution may begin in a normal manner.

A determination is made at step 406 whether the user has provided authorization to execute the macro. Such an action may occur at the beginning of the macro code execution. For example, the user authorization may be part of a practice for preventing malicious code from running, as described above.

If user authorization does not exist, the user authorization requirements are fetched in step 410, and the user is prompted for authorization in step 412. If the user provides authorization at step 414, the user's authorization is stored at step 416; otherwise the process 400 ends at step 418. The user authorization requirements may include, for example, a list of the types of malicious results that may occur if the macro is allowed to execute. The list may be presented to the user at step 412.

If user authorization exists, wrapped services are created at step 408. The wrapped services (or "beans") may be created, for example, by the wrapped service creator 212. Such action may be optional and may be used to protect the executing code from malicious interference, as described above.

The script (or macro) is executed in the script executor in step 420. For example, referring to FIG. 2, the script may be executed by the script executor 208. The execution occurs, for example, within the macro server sub-system 202 as opposed to macro execution that occurs locally on the client. The script execution may occur in a normal manner, with a portion of the sub-system stepping through the steps in the script and carrying out their actions as each step is met. A determination is made at step 422 whether a continuation has been encountered. If so, the continuation is stored at step 428. A continuation may be used to, in effect, pause a script until a particular time or event has occurred. If no continuation is encountered, processing resumes at step 424, where a determination is made whether an error has been encountered. If no error is encountered, execution of the macro ends successfully at step 430. If an error is encountered at step 424, the user is alerted at step 426 before the macro's execution ends at step 430. Thus, by this process, a user may be provided with functionality provided by a macro that is triggered from actions by the user on a client device (or by other events), and the macro may execute on a sub-system that is separate form the client device. The execution may occur, in some instances, when the user is not on-line, and the results of the macro execution may be made available to the user and to other users who are registered with the system.

Continuations may serve as a "snapshot" of the execution state of the script interpreter, freezing execution so that execution may be resumed later. This is conceptually similar to how a breakpoint operates in a debugger, or an "alert" call in standard browser-side execution (e.g., JavaScript). Continuations may be implemented as a binary serialization of all objects in the interpreter (e.g., all local variables and "beans"), and a pointer to the current execution point. The continuations may be implemented within the script executor 208, which may enable continuations as a publicly available feature. All objects (e.g., including "beans") may be serialized by the script executor 208 using, for example, Java serialization, which is a standard feature of Java. Using Java serialization, an object (and all of its children objects) may be written out to a binary stream, which contains object identifiers and the current value of all fields. When a macro resumes, the script executor 208 may be given the continuation binary data, which may be used, for example, in de-serialization into new, live Java objects.

In some implementations, continuations may be stored in a database. Continuations are stored in a database, for example, until a macro is resumed, rather than in server memory. One reason for database storage may be because a server may restart between the time a continuation is triggered and the time the user resumes execution (e.g., by hitting an "ok" button on a dialog or some other resumption action). In some implementations, continuations may have a pre-determined lifetime (e.g., six hours), after which they may be discarded. In this way, continuations don't keep on taking up disk space, such as if the user never gets around to hitting the "ok" button.

Figure 4B:
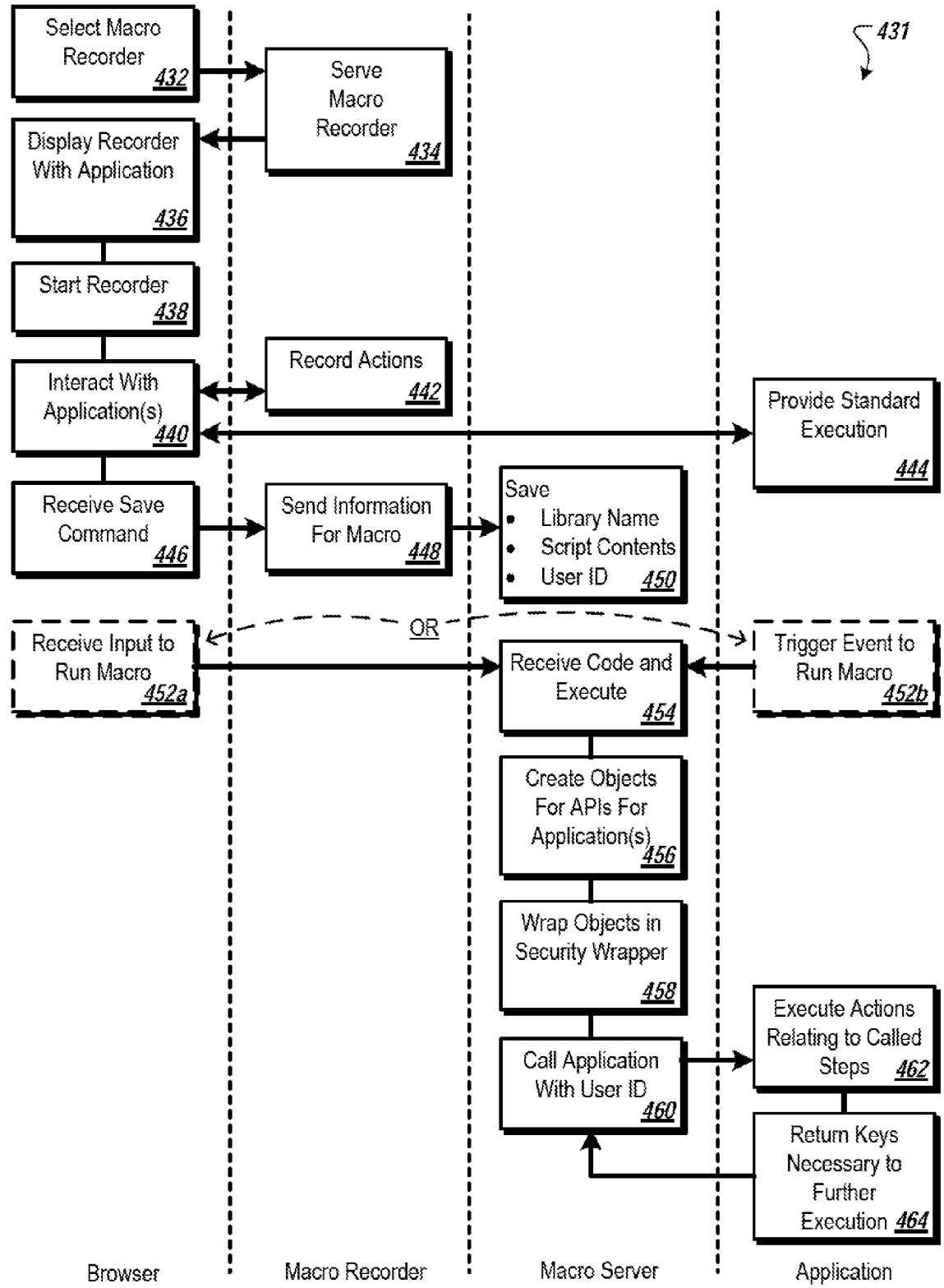
FIG. 4B is a swim lane flow chart of a process for recording and executing a macro on a hosted system.

FIG. 4B is a swim lane flow chart of a process 431 for recording and executing a macro on a hosted system. The example process 431 includes interactions among a browser, a macro recorder, a macro server and an application. In general, the process provides a set of macro recording controls to a user, from a server sub-system, whereby the user can employ the controls to indicate when actions taken by the user and the system should be recorded, and such actions may then be reformatted into code for a macro the re-executes the actions when the macro is called.

The process begins at box 432, where a macro recorder is selected by the user. The selection may occur on the browser, for example, when the user selects a control to begin recording a macro. The macro recorder is served at step 434. The macro recorder may be executing on the user's browser, or the macro recorder may execute remotely, such as at the macro server sub-system 202. The macro recorder may be displayed, for example, in a borderless browser window that is separate from a window that is currently displaying an application on the user's client device. The recorder may also be served in other manners, such as in an iFrame or similar element that is part of the same page that is displaying the application.

At step 436, the macro recorder is displayed with the application. For example, if the user is executing a spreadsheet application within his browser on his laptop computer, a popup or other display may appear and represent the macro recorder. The macro recorder may be displayed with various controls for controlling the operation of the recorder, such as record, pause, and stop buttons that a user can select. Recording is started at step 438, meaning that the user may begin keystrokes, etc. that define the macro. Such recording may be triggered by a message being sent to t server sub-system that serves the recorder via code that displays the recorder, indicating that a user has selected a record control on the recorder.

At step 440, the user interacts with the application(s), meaning that the user performs the operations (keystrokes, selections, etc.) that are to define the macro's functionality within the application(s) being used by the user. For example, the user may select a range of cells in a spreadsheet, may execute commands on those cells (e.g., to copy and paste them, to enter formulae in them, etc.), and may perform other such actions.

At step 442, during the time that the user is interacting with the application(s), the macro recorder begins to record the actions of the user, which may include displaying commands as they are recorded by the user during the recording process. As noted above, the recorder may interpret the user inputs in the same manner that the application(s) interpret them, and may then convert such interpreted actions into commands that the macro can later feed to the applications when it is run. The recorder may also track the application (e.g., browser window) within which a user executes commands, so that the macro may know to provide commands to those various different applications when it is run.

While the user is interacting with the application(s) and the actions are being recorded, standard execution of the user's actions is provided at step 444. The execution may occur within the application(s) with which the user is interacting. Thus, the actions of the user may be provided to the applications and to the macro recorder in parallel, so that the actions are recorded, and also so that the applications react to the actions in an appropriate manner.

Upon completion of defining the macro, a save command is received from the user, such as by pressing the "Done" key, a "stop" button in the recorder, or other control. At step 448, the information for the macro is sent. Such information may be interpreted into macro commands at record-time as commands are executed by a user, or may be interpreted and converted when the macro recording has stopped. The macro recorder may then send the information, for example, to a macro store, and may generate one or more pointers (e.g., URL's) to the macro code so that the code can be accessed easily at a later time. For example, the macro recorder may request the user to identify a key combination to be used to launch the macro at a later time.

At step 450, the macro information is saved, including the library name (in which to store the macro), the script or macro contents (as recorded by the macro recorder), and the user ID. Other information may also be saved and correlated to the macro as appropriate.

Later on, either moments later or days to years later, when the user decides to run the macro, the user may specify the macro to be run. Selection of the macro may be accomplished, for example, by selecting the macro name from a list of macros defined for the application(s) with which the user is currently interacting. For example, a list of macros that are accessible to the user may be stored in association with the user's account, and may be displayed to the user in a list (where the maker of each macro has provided an understandable name for the macro). Alternatively, selection of the macro may be made automatically, such as by the execution of another macro, by the occurrence of an event on the system independent of action by the particular user, or in other manners. The user may also make the saved macro available to other users, such as by being prompted for email addresses or other account identifiers of other users who the first user would like to have access to the macro. The user may also provide a group of other users, such as by pointing to a messaging group (e.g., an email list) or all users for a particular domain or sub-domain (e.g., all users accessing the system from the user's employer).

For example, input to run the macro may optionally be received at step 452a, such as from the user. Alternatively, a trigger event to run the macro may occur at step 452b. By either mechanism, macro code corresponding to the macro is received and executed at step 454.

At the initial stages of macro execution, objects are created at step 456 for the APIs corresponding to the application(s) associated with the macro. Such objects may represent objects needed to execute the macro, and may include, for example, objects translating commands from one format to another, objects that wrap other objects, quota imposing objects, and other such objects.

The objects are wrapped in a security wrapper at step 458. Such wrapping may occur by the mechanisms described above, and may be used to protect the user from execution of malicious code on the system.

At step 460, the application is called (or invoked or executed) with the user ID. Calling the application may be performed by the macro server sub-system 202. The user ID is included in the call in order to check authorizations, such as by insuring that the user in authorized to read, update or delete particular files, etc.

At step 462, actions are executed related to the steps to be performed in the called applications. For instance, the actions may correspond to individual instructions or steps that were recorded in a recorded macro. The execution of the steps occurs in the application, which may be physically remote from the browser upon which the macro was recorded. In fact, the macro may have been recorded and saved by an entirely different user on a different browser in some examples. In such a case, the different user may be a friend or family member who was authorized to use the macro by the user who originally recorded it.

At step 464, keys are returned that are necessary for further execution. These keys may include, for example, inputs provided by the user or parameters passed by the application itself. The "keys" returned from a target application (e.g., a spreadsheet application) may identify any items whose state may have changed as a result of the given command. For example, a command INSERT_SHEET may result in a new sheet being the "current" sheet. The macro may have other commands (e.g., getActiveSheet) that are operable to reflect the new, current sheet. Other commands (e.g., INSERT_ROW) may change the current selection, changing which cells are currently the active ones. Current state and selection data may be returned to the macro for storage in case any subsequent commands (e.g., getActiveSelection) need the information.

The steps 460, 462 and 464 may continue to run relatively simultaneously until the macro completes. The end may occur when the last instruction is encountered and executed at step 462, or when an event in the execution of the macro halts the execution of the macro.

Figure 5:
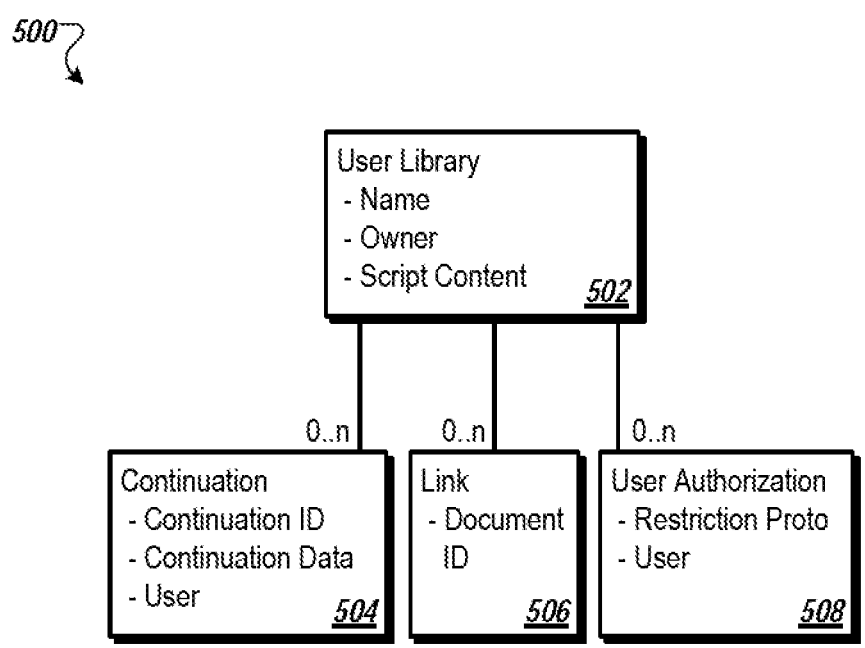
FIG. 5 shows an example structure for objects in a macro system.

FIG. 5 shows an example structure for objects in a macro system, specifically an example logical structure for information in structure such as the script information repository 206 in FIG. 2. The logical structure 500 is represented by nodes 502 through 508. For any one macro stored in the script information repository 206, for example, there may be at least one structure 500 or portions thereof. Continuation nodes 504, link nodes 506, and user authorization nodes 508 all have a 0 . . . N relationship to the user library node 502, meaning that for each user library (or header) node there may be any number of (including zero) continuations, links and user authorizations.

The root node of the structure is the user library node 502, which defines, for example, the name of the macro and/or library (e.g., "Macro_XYZ" in "Dan's Cloud-based MacroLib"), the macro library's owner (e.g., "Dan"), and the script (e.g., macro code) associated with the macro. Each macro library may have a unique identifier, such as a 64-bit pseudo-random number, which may also serve as a database primary key. In some implementations, fields such as the library name and the set of functions contained within the library are not used when retrieving a macro from the database; they are strictly for use when running/displaying the macro library. The "owner" field may be used, for example, as a foreign key with operations such as "get all macros owned by user XYZ." The link table may be used, for instance, with operations such as "get all macros used by document XYZ."

The continuation node 504 may include a continuation ID, continuation data (e.g., from additional entry points, such as for resuming the macro with additional inputs after the macro has gone into a wait state), and a user name (e.g., the user who created the continuation node 504). Multiple continuation nodes 504 may exist for a given macro. The "owner" of a continuation may be recorded primarily to prevent session hijacking so that, for example, user X cannot resume a macro that had been running as user Y. In this way, operations may ensure that only userY can resume a macro which they initiated. Multiple such records may be allowed because one user may have several continuations (e.g., three open spreadsheets in separate windows, each with an active prompting dialog box). Multiple users may also be simultaneously running their own instance of a macro, each with their own dialog prompt.

The link node 504 permits outside entities to link to the macro. The link node 504 may include a document ID, which may be the URL or some other path name that "points to" the macro. Multiple link nodes 506 may exist, as there may be several different names for (and several different URL paths or other paths to) the same macro.

The user authorization node 508 may contain information that allows restricted access to the macro. For example, a restriction protobuffer field may control access using a protocol pattern of value, while a user field may control access based on a user ID. Either or both may be used in each node 508. Multiple user authorization nodes 508 may exist for a given macro, each one identifying a different authorization level. The user authorization node 508 may enforce the existence of only one authorization record per user, per macro. The enforcement may employ a representation of the user's stamp of approval for their execution of that macro, and the things that the macro may do. Multiple records may be allowed only because multiple different users may have each authorized the macro, and each may have authorized different actions for it to execute. When user X executes a macro, their authorization record for that macro is pulled up; all others are ignored.

If the requirements for a macro change (e.g., if the author adds a call to Blogger) which alters the requirements that the macro needs to run, the existing user authorizations may be marked as invalid. As a result, when a user tries to re-execute the macro after the additional requirement was added, they may be re-prompted for authorization. For example, the prompt may say "this macro requires access to Calendar and Blogger", where previously the macro may have simply said "this macro requires access to Calendar". Prompting may not be needed for re-authorization if services are deleted; only if the requirements increase.

FIG. 6 shows an example screen shot of a macro construction system 600. A user may use the system, for instance, to establish parameters and rules for macros which may subsequently execute, for example, based on external events, or may run manually when the user chooses. In general, the system organizes macro construction into three phases that are each shown in a column of the screen shot, and each phase (including sub-phases within each phase) may change as phases before it are configured. Using such a system, a user may quickly identify a trigger for a macro, parameters for operating the macro from available parameters relating to the selected trigger, and results of the macro that correspond to the selected parameters.

In one example, the user may construct a macro that performs an email function based on an email-related event. In another example, the macro may be constructed to perform operations in non-email-related applications (e.g., spreadsheets, word processing applications, etc.). In yet another example, the user may construct a macro that has output, yet does not depend on any triggering event. Regardless of the types of applications that are the triggers or the outputs, simply making user selections on the screen may automatically result in the construction of the corresponding macro. Software applications running "behind" the screen can, for example, process the user's inputs and selections on the interface shown in the screen shot of FIG. 6, and may automatically construct a macro, including inserting the appropriate macro syntax, various application- and language-specific API calls, and other components of the macro that are required for it to run. All of this may be transparent to the user who simply enters a few inputs in a few fields that make sense.

The screenshot 600 includes a macro name field 601, which identifies the macro currently being constructed (e.g., as defined initially by the user or updated later). As noted above, the definition for the macro may occur in three general areas: a macro trigger data area 602, a macro processing data area 604 and a macro output data area 606. The macro trigger data area 602 may include fields and controls that the user may employ to decide on and identify conditions or events under which the macro will be triggered. The macro processing data area 604 may be used to define the processing that will occur when the macro runs. The macro output data area 606 may identify the output of the macro, such as the type of application data upon which the macro will act and the action (or operation) that will occur on that data. Other data definition areas in addition to the data areas 602-606 may exist, such as multiple macro output data areas 606 if the data in multiple applications is to be updated by the same macro. In some implementations, commit/rollback techniques may be used to assure that all updates are made, or none at all, which may help to preserve data integrity.

The three data areas 602, 604, and 606 may be designed to be completed generally in sequence. In some implementations, the values selected by a user in one area may affect what is displayed on the field or control below, or to the right of that area. For instance, data entered in the macro trigger data area 602 may affect the types of fields and data selections that are displayed (and user-selectable) in the other areas (e.g., the data areas 604 and 606). For example, if the user selects "email" as the triggering mechanism of the macro (e.g., by specifying or selecting "email" in the property field 608), options available in the macro processing data area 604 may be tailored to email properties.

The macro trigger data area 602, as depicted in this example, includes a property field 608, an activity field 610, and a parameters field 611. The values displayed (and selectable by the user) in the activity field 610 may depend on the user's selection in the property field 608. For example, by selecting "email" in the property field 608, the values in the activity field 610 include email-related options (e.g., incoming message, inbox size, tag size, etc.) Selection of a different property (e.g., online auction) may result in a different list of entries (e.g., item amount, item category, etc.) in the activity field 610. The parameters field 611 may be used to assign a value to an activity. Potential values that the user may enter or select in the parameter field 611 may include, for example, sizes, colors, dollar amounts, time periods, language, gender or just about any quantitative or qualitative value that is appropriate for the particular application. In some implementations, the label on the parameters field 611 may be labeled automatically (e.g., size, color, price, etc.) depending on the value of the activity box 610.

The macro processing data area 604 includes a conditions field 612, a check services field 614, and a services values field 616. The conditions field 612 displays options for identifying conditions that will trigger certain actions by the macro (e.g., such as forwarding an incoming email in a certain manner). The exact values (e.g., "from user" or "from user in group" and so on) that are displayed in the conditions field 612 may depend, for example, on the user's entry (e.g., "email") in the property field 608. If the user selects a different value for the property field 608 (e.g., "spreadsheet"), a different set of values may be displayed in the conditions field 612 (e.g., related to spreadsheets).

The check services field 614 may identify services external to the application and macro to be checked by the macro in gathering information for the running of the macro. For example, by selecting "Locator" in the check services field 614, the user may be defining that the macro should check during its execution, the location of the sender, the location of user X, or the location of a specific user listed in the carbon copy line of an email, or other choices. The services values field 616 identifies what particular values are to be returned to the macro from the service or services that are referenced. The locations in this case may be, for example, based on near real-time GPS locations, locations tracked by cellular telephone triangulation, street addresses, ZIP codes, or any other appropriate locating criteria.

In some implementations, macro processing data area 604 may include various mechanisms for using Boolean operators in macros. These mechanisms may be in addition to the implicit "AND" that is suggested by having the conditions field 612 AND the check services field 614. For example, the conditions field 612 may be used with a set of any/all controls 617, depicted as radio buttons, which may facilitate the specification of explicit AND/OR operators and logic. For instance, the user may select the "Any" (or the "All") option of the any/all controls 617 in order to specify at that any (or all) of the individual options checked in the check services field 614 are to be considered for the macro.

In some implementations, additional Boolean controls and fields may be provided for other fields, etc. on the macro construction system 600, such as straight text input of field names, field values, Boolean operators and the well-placed parentheses. Those types of more advanced types of controls may be included, for example, on screens or other interfaces that may be reachable by selecting an advanced Boolean control 618. In some implementations, accessing the advanced Boolean control 618 may allow the user to see existing logic for the entire macro, and may include, for example, the current logic represented by updated user selections and inputs made in the data areas 602 through 606. The system 600 may perform automatic syntax checks and verify that fields entered by the user (or selected from a list) are compatible with values that they are checked against.

The macro output data area 606 includes a property field 620, an action field 622, and a parameters field 624. These fields may be used, for instance, to designate the particular output of the macro (e.g., do this, send that, update a particular file, field or spreadsheet cell). In the example shown in FIG. 6, "email" is selected for the property 620, resulting in email-related entries being displayed in the action field 622. Thus, the output for this macro will be to send an email of some form to some address or addresses.

The parameters field 624 may be used, when necessary (e.g., based on selections and fields above it), to assign a value to a field or selection. In some implementations, values of fields may be defined "behind" the field, so that double-clicking on a field name may display a popup for defining a value for the field, and hovering over a field may display the field's current value.

In the example macro construction screen depicted in FIG. 6, the macro trigger data area 602 is defined to trigger the macro when an "incoming message" (e.g., identified in the activity field 610) is received by an email application (e.g., per the property field 608). The macro processing data area 604 includes conditions 612 specifying a specific user, containing specific words in the body of the email, and based on the location of user X. The values for these conditions may be defined, for instance, in other parameters fields (not shown in FIG. 6). Thus, the macro will execute to completion if such conditions are met. The macro output data area 606 shows that "email" is the type of output of the current macro, and the action to be performed is "text me" (e.g., as defined in the action field 622). As a result of the values entered in the data areas 602 through 606, upon the detection of a triggering event of an incoming email message from a particular user, containing specific words in the subject line, and based on the user X's location, the macro uses a messaging application to send a text message to target of the incoming email, telling them that such an email was received. An advantage of the example macro construction screen is that it provides this information to the user in a concise GUI format, while hiding the underlying macro that performs the function, and the user does not even have to know how to write a macro or even how to recognize one. The screen may be used to construct a full macro or to construct part of a macro, wherein the user may add other code to the macro that could not be provided by the screen.

The user interface for defining macros may include buttons or controls 626, for example, to "save" the macro being input or updated, to "undo" one or more updates or changes to the macro, to "display" the resulting macro, or to "cancel" the edit without saving. A "copy from" field 628 may allow the user to create and define a new macro by copying an existing macro, or copying parameters for an existing macro so as to pre-set the screen in an initial state that the user may then alter. A description field 630 may allow the user to record the purpose of the macro, or to provide some level of meaning to the macro that is not captured in the macro's name.

In some implementations, macro definitions may have time elements associated with them, such as an effective date 632 for when the macro will first take effect, an expiration date 634 for when the macro will no longer execute, and a schedule or "run on" field 636 that may be used, for example, to specify the days (weekdays, Mondays, weekends, etc.) that the macro will execute. Date fields may include specific dates or date ranges and/or times, or may include enumeration types (e.g., now, never, weekdays, etc.).

In some implementations, the user interface provided by the system 600 may be adapted to execute on user devices having smaller displays, such as smartphones, etc. For example, the data areas 602 through 606 and other fields may be provided in sequence. In some implementations, scroll bars may be provided for the entire screen, allowing the user to navigate to one general area at a time.

The macros constructed using the system 600 may be used with the security aspects described above with respect to the systems 100 and 200 and FIGS. 1 and 2. In particular, each constructed macro may be wrapped in a capability-based security wrapper. The system 600 may include security-related fields (not shown) that may facilitate security, including for example, the names of other users who may use the macros and the extent to which they may perform operations (e.g., send emails, update spreadsheets, etc.).

Such capability-based security may provide benefits by taking into account a user's intentions when authorizing code to execute. In such a system, and by example, the executing user creates objects, called capabilities, that encapsulate each operation that the user wishes to allow, and passes these objects to un-trusted code that is to execute. These objects become part of the payload (e.g., part of the wrapper) when un-trusted code is executed by the system, and are not modifiable or creatable by the un-trusted code. When the un-trusted code attempts to access an underlying, trusted resource (e.g., conventionally, a file system, etc.) it may only do so via an object the user created that wraps the trusted resource. Capabilities can allow fine-grained control over access to be granted to un-trusted code and may be used to construct an execution environment that adheres to the principle of least privilege. This means that any given module may only perform the smallest set of actions that are necessary for it to be able to do its function, and no more.

Having described example systems and processes regarding a hosted macro-based system, the following paragraphs describe a series of examples for employing such systems and processes, many of which discuss how a system can use capability-based security to handle each of these cases, and how to mitigate some risks that may be part of such examples.

Example #1

Sales Policy Enforcement

Consider a scenario in which the sales department for an organization is creating, in a spreadsheet, proposals for potential customers. The spreadsheet contains the cost of all products and features that the company produces. As the salesperson goes down the sheet, he or she may mark a feature as active or inactive (i.e., currently available for sale) with a 1 or 0 in the column next to the feature. The sheet may contain formulas to compute pricing, including various discounts and price multipliers.

There may be many dependencies between the line items, for example, including some features that may be mutually exclusive. These rules could be expressed as macros. Alternately, the rules could be expressed in a rule language that would be compiled into macros attached to the sheet to enforce the rules. Additional rules may include error checks and other consistency checks. In addition, there may be rules associated with promotions or triggered events based on region or other factors.

One thing to consider about such rules is how they would be administered. For example, it may be helpful to have the macros and/or rules live in a shared library that the sheet references, so that an administrator can readily update values in the sheet. Also, the macro should be part of a suite of tools that a system administrator provides to various small business owners, and may permit each of those users to access and execute the macro. The administrator may keep the macro updated from a central location on an hosted system, and the users can all execute the macro from that location.

Thus, the macro may be published in a shared mode, with a single "slot" for each spreadsheet that accesses the macro. Another user may import the macro into their spreadsheet by including a URL that points to the macro in their spreadsheet, and may grant it the authority to write to that spreadsheet.

Example #2

Investment User Interface

Consider a scenario in which an investment firm has pricing models in a spreadsheet, and would like to pull stock quotes from an external service and inject them into a spreadsheet to generate recommendations (e.g., buy, hold, etc.).

The script may need to read from and write to the spreadsheet, and to access an external stock quote service. The author may grant the script access that restricts the script to only the specific stock quote service. If the author were to leave that slot empty, a user who invokes the service should be asked not only whether to grant the script the authority to contact a service but which specific service to contact. That way, the user may constrain what the script can do; the script will not be able to contact any other service.

If a user wanted to share this macro with other users for inclusion in their own spreadsheets (e.g., to copy the macro rather than reference it), the other users would need their own authority to access the external stock quote service. If the user shares the macro by letting others point to it at a central location, users may be able to use the macro even if they themselves do not have the authority to contact an external stock quote service. They could, in such a situation, be granted the authority that the script itself has (though they may not be able to access the service from their own scripts).

Example #3

Accident Reporting

Consider a scenario in which a bus transportation company is interested in automating its accident reporting. A driver who gets into an accident may access a hosted service to fill out a form in a spreadsheet that records information such as the location of the bus, etc. A macro may be used to route the report to various supervisors for their review.

The macro may need to identify a supervisor (e.g., via another spreadsheet it has access to, a database query, etc.), generate a correct email address of the legal department, and share the document with those people, as well as send an email, and access other spreadsheets (e.g., a spreadsheet that includes a record of which accident reports are pending). It may be that those people will need to edit the spreadsheet further and then trigger an event that moves the macro forward. The macro can run in continuation mode, so that it pauses each time a particular user has addresses a phase of the macro, and then waits for a next user to pick it up. When awakened by an event, it may check to see who has signed off on the document (e.g., as recorded in the document itself or recorded in information in the event sent to the macro), and may wait until everyone who needs to sign off has done so, at which point the macro may then notify someone else and record that the incident has been fully processed (e.g., in yet another spreadsheet). In some implementations, if two events arrive at the same time, they may get queued, so the macro only processes one continuation at a time. The workflow state can be held simply in the local variable context of the macro, as well as partially recorded in spreadsheets.

In a related scenario, accident reports that haven't been fully processed and closed out (e.g., based on workflow) can be queried. This query could require accessing the spreadsheet that contains state information about the accident reports (or simply opening the spreadsheet).

Example #4

Bus Schedule Reporting

Consider a scenario in which a bus transportation company would like to be able to notify customers of delays on certain bus lines. The company can edit a spreadsheet to update the expected times/locations of their buses, and such editing may occur automatically, such as by a macro that receives location data on the buses and computes estimated times of arrival based on such information (e.g., by identifying the bus as leaving stop X, and adding time Y to compute an arrival time at stop X+1). A macro in the spreadsheet can identify when certain bus lines are unusually delayed, and if so, it can send text messages to customers who have signed up for notification. For example, a user could subscribe to receive a text message whenever the user is downtown and within two blocks of his normal bus stop and any of the user's en route buses (e.g., bus numbers 692, 698, etc.) are likely to arrive at that corner more than five minutes late. An application on the user's mobile device may trigger when the user is in the appropriate location, so as to cause a hosted service to activate a flag on the user's record so that the user receives updates directed to the user's current location without the user having to enter the location manually (e.g., by converting the user's GPS coordinates to a nearest bus stop location).

For security purposes, the author of the macro could grant the capability to send a text message to a limited set of users (e.g., those listed in another spreadsheet, controlled by administrators), and likely publish this macro to be local only to the sheet, and not publicly accessible. The author would not grant the macro the capability of writing to the sheet. This scenario brings up the possibility of specifying the breadth of a capability by referring to a group defined in a document or other collection (e.g., a spreadsheet or some other group definition).

Example #5

Location Based Event Trigger

Consider a scenario in which one user updates a set of concert recommendations in a spreadsheet, including the address and date/time of each concert. Other users may subscribe to notifications from this spreadsheet, by asking to be notified whenever they are in the neighborhood of one of these concerts, and the time for a concert is getting close. Notifications in this case may use, for example, services such as a mapping service, a social networking service (to identify the friends of the user who makes the recommendations), a location service (for identifying when friends are in a particular location), and a text messaging service to send the notifications. Thus, a hosted macro is particularly well-suited in such a scenario.

Example #6

Surveys

Consider a scenario in which a user creates a survey or other data entry form, sends an email form to a number of other users, and adds a line to a spreadsheet that indicates how each user filled out the form.

The macro should be granted the capability to email a set of people from a certain address to a set of addresses provided by the user. The macro could track the receipt of data in the form from each user, such as by accessing a user identification feature from a hosted service or by identifying a user ID (e.g., an email address) in the response. The macro may then access the spreadsheet, enter the user ID into one column of the spreadsheet, and the user answer or answers into other columns of the spreadsheet. In this manner, a first user can quickly send a form to a group (e.g., as determined from an existing friends list or email list) and automatically tabulate comments from the group.

Example #7

Purchase Order Approval

Consider a scenario in which a user initiates a purchase order (e.g., "I want X thousand cases of Q-tips, and I prefer vendor XYZ"). When the user submits the purchase order (PO), a macro can determine, based on data such as the items, the total price, the department, etc., who needs to approve the PO. For example, if the total is greater than a fixed threshold, the PO could require chair approval. As approvers approve the PO, it can be moved along a workflow, such as a list of users defined in the macro, a database, or a spreadsheet; the macro will keep local state to remember who has and has not approved the PO; when all approvers have approved, the PO is sent to purchasing.

This macro can run best in terms of continuations. The macro would have the capability to email certain users with a link or attachment to a document with forms or URLs that those users may click to approve or disapprove a given purchase order, would have access to other spreadsheets or databases with information such as the department chairs, etc.

Example #8

Mail Merge

Consider a scenario in which a user has a names spreadsheet of names, addresses, email addresses, etc., and another document (e.g., email, spreadsheet, etc.) and would like to replace fields in the latter document with the fields from the list, and email the merged document(s) to the recipients specified in the names sheet.

For security, this is a macro that can run entirely within the context of a specific document and a list of names. The capabilities are: "allow emailing to the list, as specified in the first column of this table" as well as access to a template document. The macro itself emails people in the list with data computed from a spreadsheet line and some templates. Particular forms for a mail merging macro are well known.

Example #9

Doctor Shift Scheduling

Consider a scenario in which a number of doctors are accessing the same spreadsheet and editing it. A macro could check the spreadsheet to make sure that each doctor was following formatting or scheduling rules (e.g., maximum or minimum number of shifts in a time period) for the spreadsheet. Each user could be able to click a button to run a macro to synchronize the sheet with a calendar application, for example, for more intuitive access (e.g., for creating repeating schedules). Two-way synchronization may also occur.

The macro may be extended to be able to interface with a variety of other calendar applications. The macro may also help doctors verify that they are following the rules, to help them keep track of how many shifts they've signed up for, and to sync the spreadsheet with a calendar application Example #10

Email Plug-In

A user may define a macro to identify each instance of an incoming email to their account and cause the sender identification and subject line of the email to be copied from the email and into a next open line of a spreadsheet that is associated with the user's account. In this manner, the user may automatically keep an up-to-date log of incoming emails to their account.

Example #11

Blogging Plug-In

A user who is a blogger on a service may develop a macro for handling user comments to the blog. For example, information about a commenter may be used, such as to show a location of the commenter next to the comment (e.g., using an IP address corresponding to the comment from the user). In addition, the user may have all comments compared against a blacklist of trigger words, such as profanity, so that the user receives a text message alert whenever a comment is posted that contains an improper word. The user could then log into the blog to clean it up Example #12

Billable Hours

A user who is a consultant may track his or her billable hours in a calendar application. They could use a macro to periodically (e.g., each week or each month) parse out such entries (e.g., by recognizing a time entry in the form x.x). The Macro could then use text associated with the entry to identify a project number to which the time should be billed (e.g., a list that correlates keywords and client names to certain distinct projects), and may then add data to cells in a spreadsheet to execute the billing operation. The macro may then merge the values from the spreadsheet (after applying a per-hour rate for billing) into an invoice generated by a word processing program, and may then email the resulting document to the client. If the client is a registered user of the hosted system, the macro may make a direct request for payment (including via a form that includes a selectable mechanism that the client can use to indicate an intent to pay the bill), and the client may subsequently select the control to have money transferred from a client account to a consultant account.

Example #13

Driving Directions Mail Merge

A user of a hosted system may wish to send invitations for an upcoming party to a number of his or her friends. The user may thus prepare a shell for an invitation to the party. The user may then point a macro to a list of the friends and their addresses (e.g., in a contacts application on the hosted system) to perform, in effect, a mail merge into the invitation. However, the user may also supply their own address (the location of the party) and the address from the list, of the friend whose invitation is currently being prepared, to a mapping service, which may, according to a standard API, return an image that shows a map having driving directions between the friend's house and the party superimposed on it. The macro may incorporate the image into the invitation, which may then be sent to the friend, with automatically and custom generated directions.

Figure 7:
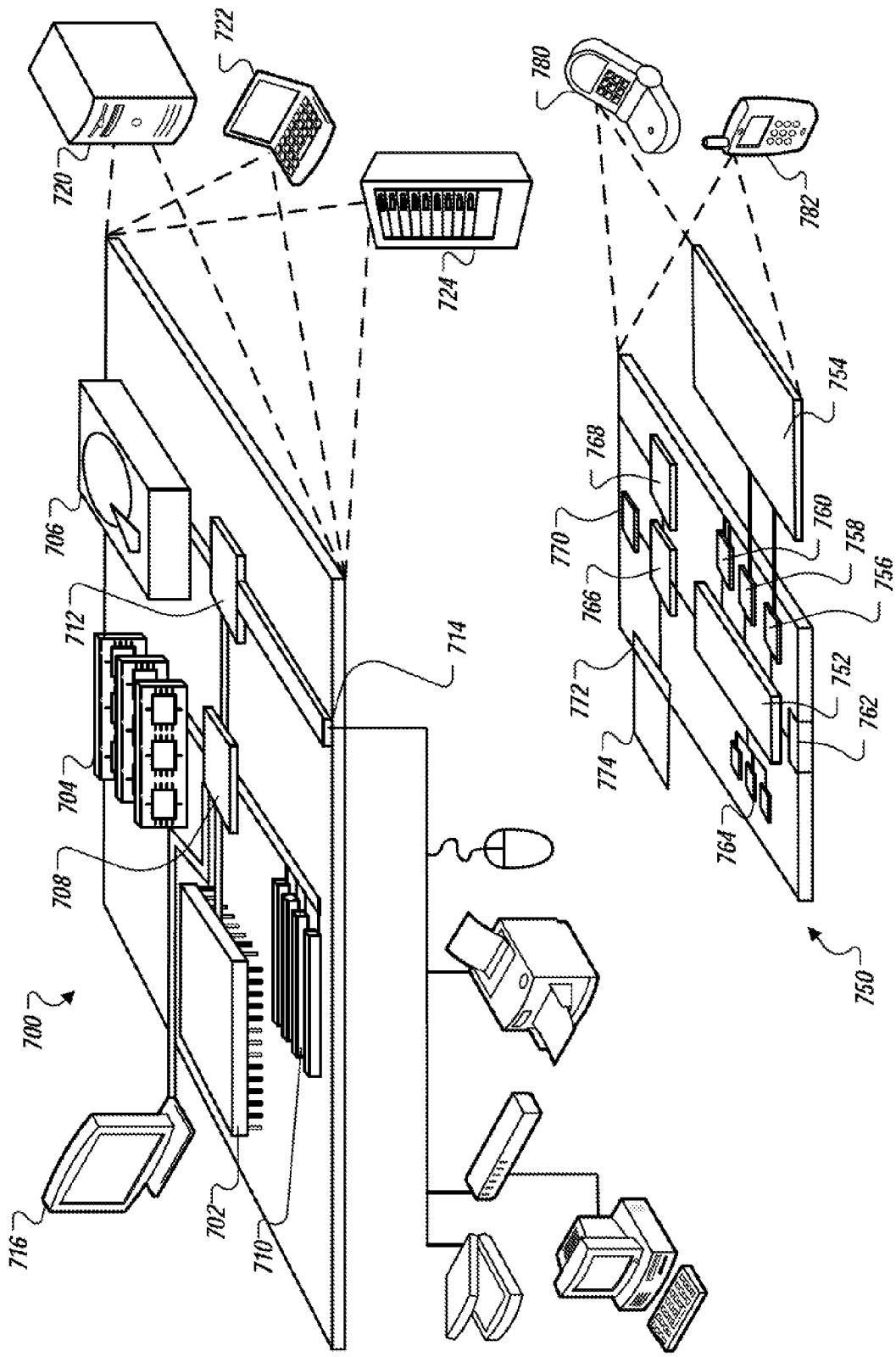
FIG. 7 shows examples of generic computer devices that can be used to execute the actions discussed in this document.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 750 and used to update the display of the respective devices 750 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular modes of triggering the execution of macros, but other approaches may also be used.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of managing computer macros, comprising:

storing code for at least one computer macro at an internet-accessible hosted computer system;

associating the macro with a registered user of the hosted computer system, and making the macro available to a plurality of different users registered with the hosted computer system according to access restrictions identified by the registered user;

tracking, by the hosted computer system, triggering events for a plurality of user accounts on the hosted computer system for executing at least one computer macro, wherein the macro is accessible in response to triggering events from the plurality of different user accounts for the plurality of different users registered with the hosted computer system;

automatically identifying with the hosted computer system, independent of whether a user associated with a user account is currently active on the hosted computer system, a triggering event that is defined as being directed to the macro;

receiving requests to execute the macro from a plurality of applications running on a plurality of different client computers remote from the hosted computer, automatically executing the macro on the hosted computer system for each of the requests, and providing results of executing the macro to each respective application of the plurality of applications in response to executing the macro;

executing the macro using an application running on the hosted computer system to generate macro results, and storing the macro results on the hosted computer system;

generating messages to communication addresses associated with the plurality of user accounts notifying the users of the results of the macro; and automatically providing the results of executing the macro to a plurality of user accounts registered with the hosted computer system.

2. The method of claim 1, wherein the triggering event comprises an incoming digital communication directed toward the user account.

3. The method of claim 1, wherein the triggering event comprises a determination of a location of a computer device user who is associated with the accountholder.

4. The method of claim 1, wherein executing the macro comprises making calls to multiple different hosted services provided by the hosted computer system.

5. The method of claim 4, wherein executing the macro comprises making calls to web services provided by third-party information providers that are independent of the hosted computer system.

6. The method of claim 1, further comprising translating information generated by a first application running on the hosted computer system to a different format and providing the translated information to a second application running on the hosted computer system.

7. A system comprising:
one or more computers and one or more storage devices storing instructions that are operable, when executed by the one or more computers, to cause the one or more computers to perform operations comprising:

storing code for at least one computer macro at an internet-accessible hosted computer system;

associating the macro with a registered user of the hosted computer system, and making the macro available to other users of the hosted computer system according to access restrictions identified by the registered user;

tracking, by the hosted computer system, triggering events for a plurality of user accounts on the hosted computer system for executing at least one computer macro, wherein the macro is accessible in response to triggering events from the plurality of different user accounts for the plurality of different users registered with the hosted computer system;

automatically identifying with the hosted computer system, independent of whether a user associated with a user account is currently active on the hosted computer system, a triggering event that is defined as being directed to the macro;

receiving requests to execute the macro from a plurality of applications running on a plurality of different client computers remote from the hosted computer, automatically executing the macro on the hosted computer system for each of the requests, and providing results of executing the macro to each respective application of the plurality of applications in response to executing the macro;

executing the macro using an application running on the hosted computer system to generate macro results, and storing the macro results on the hosted computer system;

generating messages to communication addresses associated with the plurality of user accounts notifying the users of the results of the macro, and automatically providing the results of executing the macro to a plurality of user accounts registered with the hosted computer system.

8. The system of claim 7, wherein the triggering event comprises an incoming digital communication directed toward the user account.

9. The system of claim 7, wherein the triggering event comprises a determination of a location of a computer device user who is associated with the accountholder.

10. The system of claim 7, wherein executing the macro comprises making calls to multiple different hosted services provided by the hosted computer system.

11. The system of claim 10, wherein executing the macro comprises making calls to web services provided by third-party information providers that are independent of the hosted computer system.

12. A non-transitory computer-readable medium storing software comprising instructions executable by one or more computers which, upon such execution, cause the one or more computers to perform operations comprising:

storing code for at least one computer macro at an internet-accessible hosted computer system;

associating the macro with a registered user of the hosted computer system, and making the macro available to other users of the hosted computer system according to access restrictions identified by the registered user;

tracking, by the hosted computer system, triggering events for a plurality of user accounts on the hosted computer system for executing at least one computer macro, wherein the macro is accessible in response to triggering events from the plurality of different user accounts for the plurality of different users registered with the hosted computer system;

automatically identifying with the hosted computer system, independent of whether a user associated with a user account is currently active on the hosted computer system, a triggering event that is defined as being directed to the macro;

receiving requests to execute the macro from a plurality of applications running on a plurality of different client computers remote from the hosted computer, automatically executing the macro on the hosted computer system for each of the requests, and providing results of executing the macro to each respective application of the plurality of applications in response to executing the macro;

executing the macro using an application running on the hosted computer system to generate macro results, and storing the macro results on the hosted computer system;

generating messages to communication addresses associated with the plurality of user accounts notifying the users of the results of the macro, and automatically providing the results of executing the macro to a plurality of user accounts registered with the hosted computer system.

\* \* \* \* \*